(12) United States Patent
Fukino et al.

(10) Patent No.: US 9,729,445 B2
(45) Date of Patent: Aug. 8, 2017

(54) COMMUNICATION DEVICE AND COMMUNICATION CONTROL METHOD

(71) Applicant: FUJITSU LIMITED, Kawasaki-shi, Kanagawa (JP)

(72) Inventors: Hiromi Fukino, Kawasaki (JP); Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 15/001,849

(22) Filed: Jan. 20, 2016

(65) Prior Publication Data

US 2016/0277296 A1    Sep. 22, 2016

(30) Foreign Application Priority Data

Mar. 18, 2015 (JP) ................................. 2015-055145

(51) Int. Cl.
    *H04L 12/28*     (2006.01)
    *H04L 12/743*    (2013.01)

(52) U.S. Cl.
    CPC ................................ *H04L 45/7453* (2013.01)

(58) Field of Classification Search
    CPC .................................................... H04L 45/7453
    See application file for complete search history.

(56) References Cited

U.S. PATENT DOCUMENTS

| | | | |
|---|---|---|---|
| 2002/0169937 A1* | 11/2002 | Kagawa | G06F 17/30949 711/206 |
| 2003/0026259 A1 | 2/2003 | Brown | |
| 2005/0147113 A1 | 7/2005 | Brown | |
| 2015/0078243 A1* | 3/2015 | Zhang et al. | H04B 7/2643 370/312 |
| 2016/0020992 A1* | 1/2016 | Wu et al. | H04L 49/3009 709/212 |

FOREIGN PATENT DOCUMENTS

| | | |
|---|---|---|
| JP | 2002-334114 | 11/2002 |
| JP | 2003-510963 | 3/2003 |
| WO | WO0124440 | 4/2001 |

* cited by examiner

*Primary Examiner* — Afshawn Towfighi
(74) *Attorney, Agent, or Firm* — Fujitsu Patent Center

(57) ABSTRACT

A collision detection unit detects whether a first entry that is associated with a value obtained by hashing a first MAC address is present in each area in a MAC address table and detects whether a second entry that is associated with a value obtained by hashing a second MAC address is present in each area in the MAC address table. If the first entry is present in each of the areas, a collision avoidance control unit acquires the second MAC address stored in the first entry that is present in one of the areas and inputs the second MAC address in the collision detection unit. If the second entry is not present in any of the areas in the MAC address table, a registration unit stores the second MAC address in the second entry and stores the first MAC address in the first entry.

7 Claims, 33 Drawing Sheets

COMMUNICATION DEVICE AND COMMUNICATION CONTROL METHOD

CROSS-REFERENCE TO RELATED APPLICATION

This application is based upon and claims the benefit of priority of the prior Japanese Patent Application No. 2015-055145, filed on Mar. 18, 2015, the entire contents of which are incorporated herein by reference.

FIELD

The embodiments discussed herein are directed to a communication device and a communication control method.

BACKGROUND

In communication between nodes in a local area network (LAN), communication devices, such as Layer (L) 2 switches, that relay the communication are used. The L2 switches have a Media Access Control (MAC) learning function in order to perform frame transfer.

Namely, if a switch that uses the MAC learning function receives a frame, the switch stores, in a table called a MAC learning table, the association relationship between the port that received the frame and the MAC address of the terminal that is the transmission source of the frame. If the switch receives a frame that is addressed to the MAC address stored in the MAC learning table from another port, the switch transfers the received frame from the port that is indicated that, in the MAC learning table, the learning has been completed.

Furthermore, if a lot of electronic devices are connected in a network, an amount of the processing load of the communication devices that provide a LAN service is increased. The increase in the processing load indicates that the number of entries to be controlled by the communication devices is increased.

When a communication device learns MAC addresses, the communication device often manages a MAC address table by using a ternary content addressable memory (TCAM) or a hash algorithm in order to speed up the processes.

If the TCAM is used, an advantage is provided in that the entry registration is certainly possible. However, the TCAM is expensive when compared with general purpose volatile devices and consumes a large amount of electrical power; therefore, the TCAM is unsuitable for the large amount of entry registration.

In contrast, with the communication devices that manage the MAC address table by using the hash algorithm, general purpose volatile memories can be used and thus the cost can be reduced. Furthermore, with such communication devices, because the MAC address table is degenerated by a hash expression, although a collision occurs in an entry, a large amount of entries can be managed with a small amount of resources.

Conventionally, if a collision occurs, a communication device deletes an already registered entry and then registers a new entry. If the already registered entry is deleted, it is difficult to perform the communication, which uses the MAC address table, with respect to the MAC address that is associated with the subject entry. This state may sometimes be referred to as "instantaneous interruption" of the already registered entry. Then, the communication device performs the Flooding. In this case, information is also sent to an unintended port. Because the Flooding is performed even if a Static MAC that is the MAC address that is intentionally registered by a user is used, there if a problem in that security is decreased.

Furthermore, as a management technology of MAC addresses by using the hash algorithm, for example, there is a conventional technology that divides a MAC address table into a plurality of banks and that registers an address that has been subjected to hash calculation in one of the banks. Furthermore, there is a conventional technology that performs, when an address that has been subjected to hash calculation is registered, the reordering if a location for the registration is not present.

Patent Document 1: Japanese Laid-open Patent Publication No. 2002-334114

Patent Document 2: Japanese National Publication of International Patent Application No. 2003-510963

However, even if the conventional technology that divides the MAC address table into the plurality of banks is used, because the same process as that used in the conventional technology is performed when a collision occurs, it is difficult to improve the probability that a new entry is registered in a free entry without deleting an already registered entry. Furthermore, even if the conventional technology that performs the reordering if a location for registration is not present due to a collision is used, there may possibly be a case in which, even if the reordering is performed, an address is not registered in a free entry. Thus, it is difficult to improve the probability that a new entry is registered in a free entry without deleting the already registered entry.

SUMMARY

According to an aspect of an embodiment, a communication device includes: a MAC address table that is divided into a plurality of areas and that stores therein entries which are associated with values obtained by hashing MAC addresses by using different hash functions for each of the areas; a detecting unit that detects whether a first entry is present in each of the areas in the MAC address table, the first entry being associated with a value obtained by hashing, by using each of the hash functions, a first MAC address which is input, and that detects whether a second entry is present in each of the areas in the MAC address table, the second entry being associated with a value obtained by hashing, by using each of the hash functions, a second MAC address which is input; an acquiring unit that acquires, when it is detected that the first entry is present in each of the areas in the MAC address table, the second MAC address that is stored in the first entry that is present in one of the areas; and a storing unit that stores, when it is detected that the second entry is not present in any of the areas in the MAC address table, the second MAC address in the second entry and the first MAC address in the first entry.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The communication device and the communication control method disclosed in the present invention are not limited to the embodiments described below.

[a] First Embodiment

Figure 1:
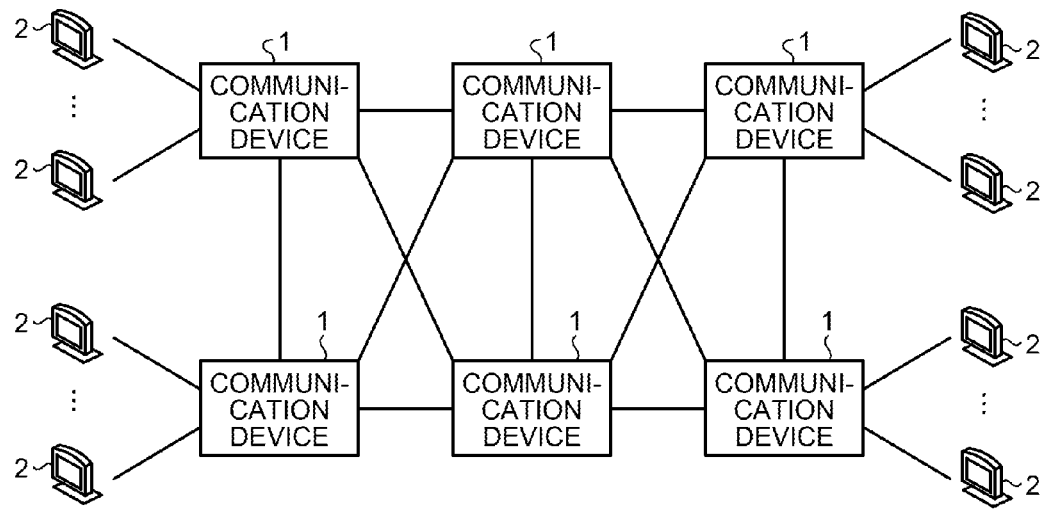
FIG. 1 is a schematic diagram illustrating the configuration of a system that includes communication devices.

FIG. 1 is a schematic diagram illustrating the configuration of a system that includes communication devices. As illustrated in FIG. 1, a plurality of communication devices 1 is arranged in a network. A plurality of terminal devices 2 are connected to each of the communication devices 1. Furthermore, the communication devices 1 are connected with each other and thus each of the terminal devices 2 can perform communication with other terminal devices 2 via the communication devices.

The communication devices 1 are, for example, L2 switches. The communication device 1 receives a frame sent from the terminal device 2 and performs, on the address information or the like stored in the frame, a transfer process of transferring the frame to the specified destination. For example, a description will be given with the assumption of a case in which the terminal device 2 sends an Ethernet (registered trademark) frame or an Internet Protocol (IP) frame. In this case, the communication device 1 performs a transfer process of a frame on the basis of the MAC address stored in the Ethernet frame or on the basis of the IP address stored in the IP frame.

Figure 2:
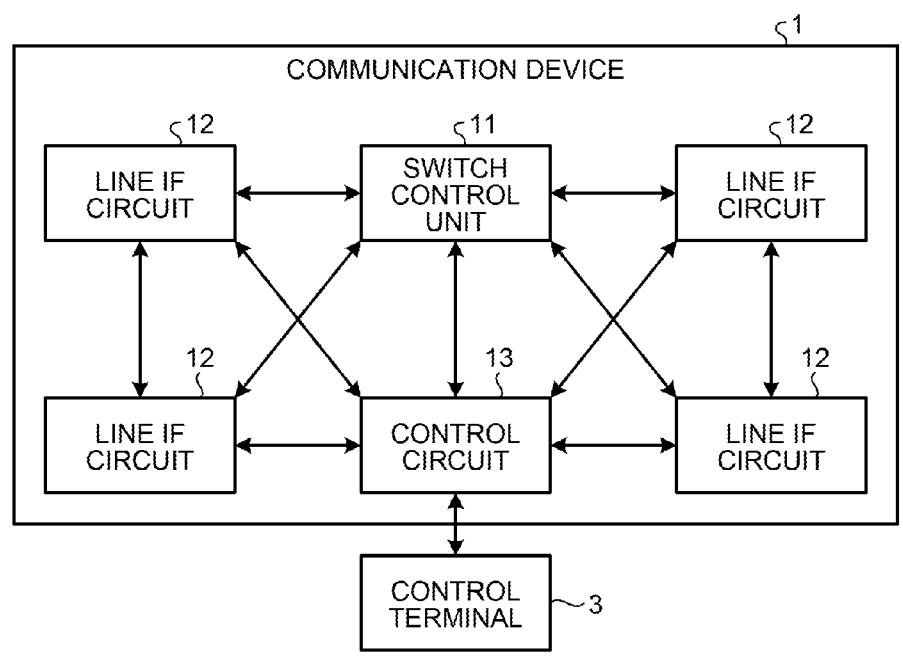
FIG. 2 is a block diagram illustrating the communication device.

FIG. 2 is a block diagram illustrating the communication device. As illustrated in FIG. 2, the communication device 1 includes a switch control unit 11, line interface (IF) circuits 12, and a control circuit 13.

Each of the line IF circuits 12 accommodates a plurality of line ports. Furthermore, each of the line IF circuits 12 provides an interface function with an external device and provides a reception frame process, a transmission frame process, and the like. The line IF circuits 12 are provided, in general, as detachable modules or detachable cards. For example, each of the line IF circuits 12 includes a plurality of ports that are used to connect to external devices. Furthermore, each of the line IF circuits 12 performs communication with the other communication devices 1 or the other terminal devices 2 via the respective ports.

The switch control unit 11 sends and receives a data signal to and from the line IF circuits 12 in the communication device 1. The switch control unit 11 is a circuit that provides a switch function of the frame transfer between the line IF circuits 12.

The control circuit 13 sends and receives a control signal to and from the switch control unit 11 and the line IF circuits 12 in the communication device 1. The control circuit 13 performs various kinds settings of the switch control unit 11 and the line IF circuits 12, notifies of an alarm when a failure occurs, and collect statistical information. In the embodiments, a control terminal 3 is connected to the control circuit 13.

The control terminal 3 is a computer for controlling the parameter setting or the like in the communication device 1. The control terminal 3 receives, from a user, an input of a MAC address to be registered. Then, the control terminal 3 sends the input MAC address as the input information to the control circuit 13. Furthermore, the control terminal 3 receives an input of data from the control circuit 13. Here, the control terminal 3 and the switch control unit 11 send and receive data via the control circuit 13; however, in a description below, to simplify a description, a description will sometimes be given as if the control terminal 3 and the switch control unit 11 directly send and receive data.

Figures 3, 4:
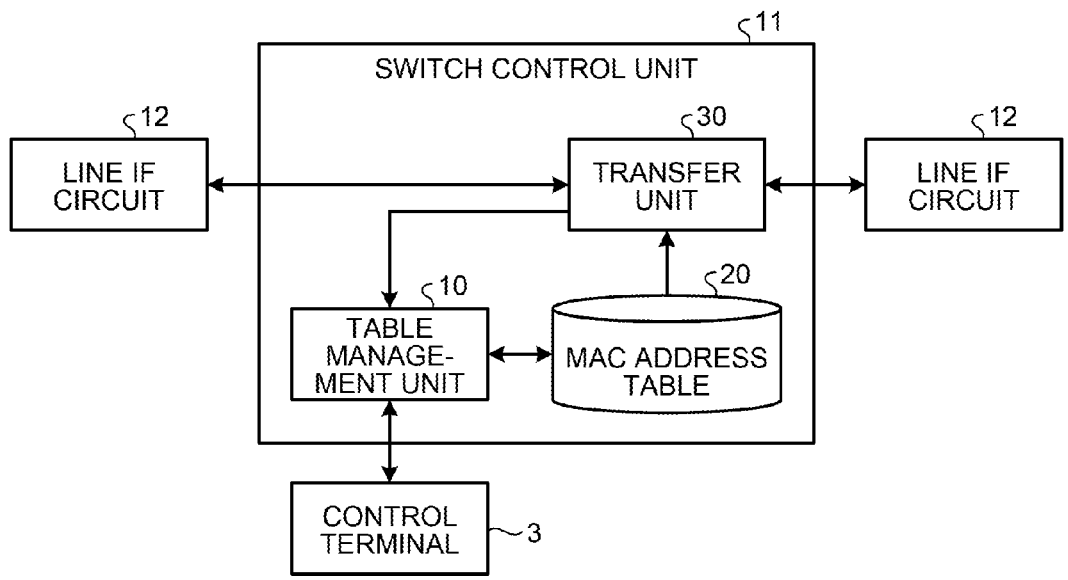
FIG. 3 is a block diagram illustrating an example of a switch control unit.
FIG. 4 is a schematic diagram illustrating an example of a MAC address table.

In the following, the switch control unit 11 will be described in details with reference to FIG. 3. FIG. 3 is a block diagram illustrating an example of a switch control unit.

The switch control unit 11 includes a table management unit 10, a MAC address table 20, and a transfer unit 30.

The MAC address table 20 is divided into a plurality of areas called banks. In the MAC address table 20, information indicating, for each bank, a combination of a MAC address and a port number of the transmission destination when a frame is sent to the destination of the subject MAC address is registered. Except for a collision avoidance process, which will be described later, performed when a MAC address is registered, the same MAC address is not registered in different banks. Namely, in the MAC address table 20, a MAC address is associated with a port number 1 to 1 and then registered. In the MAC address table 20, for example, information is registered in the state illustrated in FIG. 4. FIG. 4 is a schematic diagram illustrating an example of a MAC address table.

Furthermore, in the MAC address table 20, two types of MAC addresses, i.e., a static MAC address and a dynamic MAC address, are registered. The static MAC address is a MAC address that is intentionally registered by a user and in which the association relationship with a port is fixed. The dynamic MAC address is a MAC address with which an appropriate port number is associated by the switch control unit 11, i.e., a MAC address in which the association relationship with a port is dynamically changed. This MAC address table mentioned here corresponds to an example of a "MAC address table".

The transfer unit 30 receives, from the line IF circuit 12, the frame sent from the terminal device 2. Then, the transfer unit 30 acquires the MAC address stored in the frame. Then, the transfer unit 30 acquires the port number associated with the acquired MAC address from the MAC address table 20.

Then, the transfer unit 30 transfers the frame to the line IF circuit 12 that has the port that is associated with the acquired MAC address.

Furthermore, if the acquired MAC address is not registered in the MAC address table 20, the transfer unit 30 performs the Flooding and specifies a port number of the transmission destination. Then, the transfer unit 30 outputs, to the table management unit 10, the acquired MAC address and the specified port number of the transmission destination.

A description will be given of a case, as an example, of using the MAC address table 20 illustrated in FIG. 4. If the transfer unit 30 receives, for example, a MAC#A as a MAC address from the received frame, the transfer unit 30 specifies that, from the MAC address table 20, the port associated with the MAC#A is the port that has the port number of 2. Then, the transfer unit 30 transfers the frame to the line IF circuit 12 that has the port with the port number of 2.

A description will be continued here by referring back to FIG. 3. The table management unit 10 manages the registration information in the MAC address table 20. For example, the table management unit 10 receives, from the control terminal 3, an input of the MAC address to be registered and an input of the port number associated with the subject MAC address. The table management unit 10 decides the entry at the registration destination in the MAC address table 20 on the basis of the port number. If a MAC address is not registered in the subject entry, i.e., if the subject entry is a free entry, the table management unit 10 registers the received MAC address and the port number in the subject entry. If the subject entry is not a free entry, the table management unit 10 performs a collision avoidance process, which will be described later, in order to avoid the collision of entries and then registers the received MAC address and the port number. If the collision is not able to be avoided even if the collision avoidance process is performed, the table management unit 10 notifies the control terminal 3 that the registration is not available. In this way, the MAC address that is registered in the combination of the MAC address that is input from the control terminal 3 and the port that is associated with the subject MAC address is a static MAC address. In a description below, registration of the association relationship between a MAC address and a port number in the MAC address table 20 is simply referred to as "registration of the MAC address".

Furthermore, the table management unit 10 receives, from the transfer unit 30, an input of the information on the MAC address and the port at the transmission destination that is associated with the subject MAC address specified by the transfer unit 30. Then, similar to the case in which an input of a MAC address and a port number that is associated with the subject MAC address is received from the control terminal 3, the table management unit 10 performs the collision avoidance process or the like and then registers the MAC address.

Figure 5:
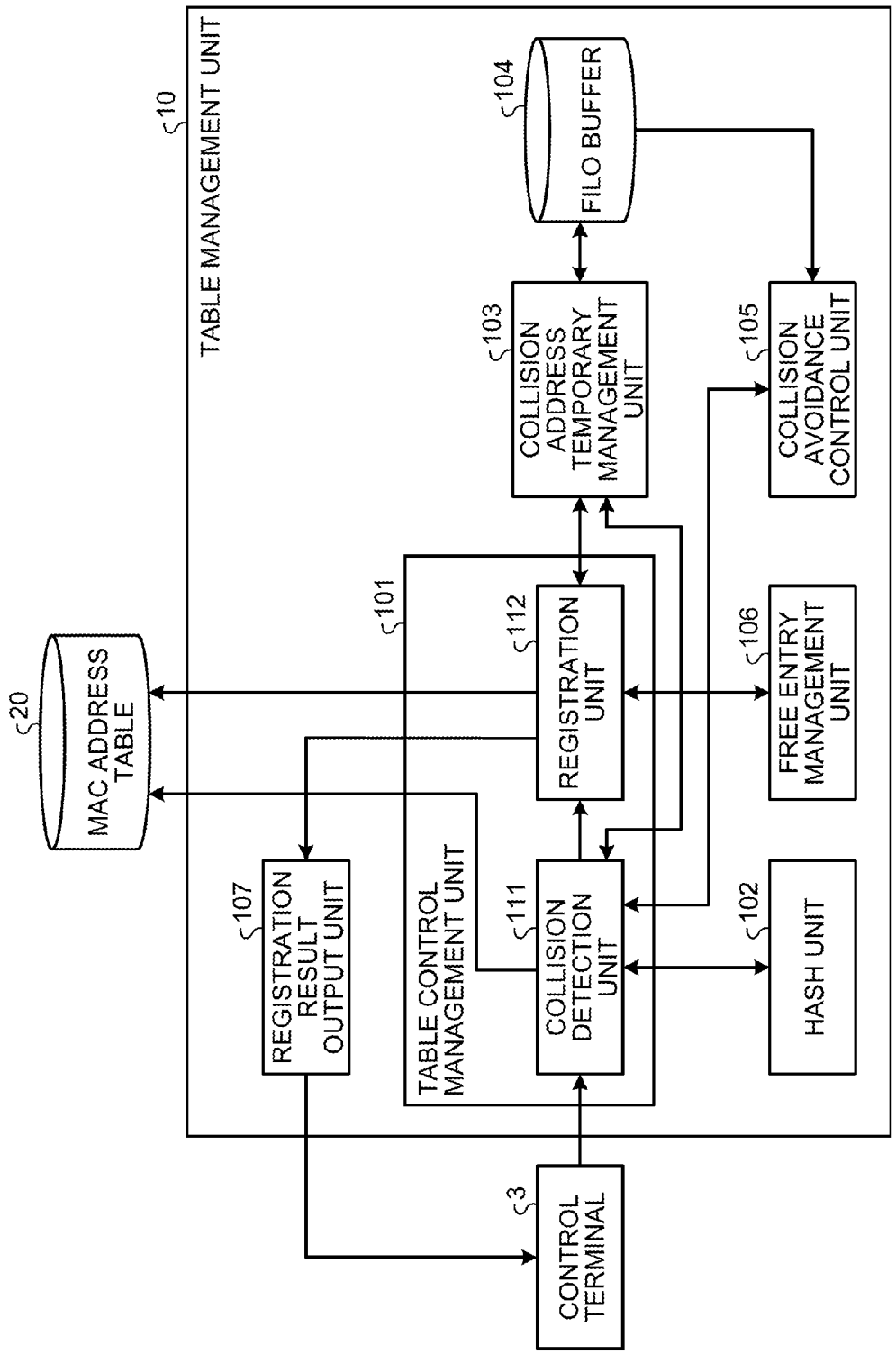
FIG. 5 is a block diagram illustrating, in detail, a table management unit.

In the following, management of the MAC address table 20 including the collision avoidance process performed by the table management unit 10 will be described in detail with reference to FIG. 5. FIG. 5 is a block diagram illustrating, in detail, a table management unit.

The table management unit 10 includes a table control management unit 101, a hash unit 102, a collision address temporary management unit 103, a First In Last Out (FILO) buffer 104, a collision avoidance control unit 105, a free entry management unit 106, and a registration result output unit 107. In below, a description will be given of a case in which the control terminal 3 inputs a static MAC address to the table management unit 10.

The table control management unit 101 includes a collision detection unit 111 and a registration unit 112. The collision detection unit 111 receives an input of a MAC address and a port number from the control terminal 3. In a description below, the MAC address received from the control terminal 3 is referred to as a "reception MAC address". This reception MAC address mentioned here corresponds to an example of a "first MAC address".

The collision detection unit 111 has information on the priority of each of the banks in the MAC address table 20. Furthermore, the collision detection unit 111 instructs the hash unit 102 to perform the hash calculation that is associated with the bank to which the first priority is given for the reception MAC address.

Thereafter, the collision detection unit 111 receives, from the hash unit 102, an input of the calculation result of the hash calculation on the reception MAC address. Then, the collision detection unit 111 determines whether the MAC address has already been registered in the entry associated with the received calculation result in the specified bank. If a MAC address is not registered in the entry, i.e., if the entry is a free entry, the collision detection unit 111 outputs information on the free entry and the reception MAC address to the registration unit 112. In a description below, the process of determining whether the entry is a free entry is referred to as a "collision detection process".

In contrast, if the MAC address has already been registered in the entry, the collision detection unit 111 instructs the hash unit 102 to perform the hash calculation that is associated with the bank that has the second priority. Then, the collision detection unit 111 performs the same collision detection process as that performed on the first bank on the subsequent bank.

The collision detection unit 111 repeatedly performs the collision detection process in accordance with the priority of the banks until a free entry is detected or until a collision is detected in all of the banks.

If a free entry is detected in one of the banks, the collision detection unit 111 outputs, to the registration unit 112, the information on the detected free entry and the reception MAC address. If the free entry related to the reception MAC address is detected, the collision detection unit 111 ends the collision detection process.

In contrast, if a collision occurs in all of the banks, the collision detection unit 111 outputs the reception MAC address to the collision address temporary management unit 103.

Furthermore, the collision detection unit 111 sends, to the collision avoidance control unit 105, the information on the occurrence of the collision and on the entry of each of the banks in each of which the collision occurs. Then, the collision detection unit 111 acquires, from the collision avoidance control unit 105, the information on the entry in which the MAC address that is targeted for the subsequently performed collision detection process. In the description below, the MAC address targeted for the collision detection process notified from the collision avoidance control unit 105 is referred to as a "target MAC address".

Thereafter, the collision detection unit 111 instructs the collision address temporary management unit 103 to store, in the FILO buffer 104, the information on the target MAC address registered in the acquired entry and the location of the subject entry in the MAC address table 20. In below, the information on the MAC address that is the data stored in the FILO buffer 104 and the information on the location of the subject entry in the MAC address table 20 are collectively referred to as "entry information".

Then, the collision detection unit 111 repeats the collision detection process on the target MAC address in accordance with the priority of the banks. If a free entry is detected one of the banks, the collision detection unit 111 outputs the information on the detected free entry and the target MAC address to the registration unit 112. If a free entry can be detected for the target MAC address, the collision detection unit 111 ends the collision detection process.

In contrast, if a free entry is not detected for the target MAC address, the collision detection unit 111 sends, to the collision avoidance control unit 105, information on the occurrence of the collision in the target MAC address and the entry of each bank in which the collision has occurred. Then, the collision detection unit 111 acquires a new target MAC address from the collision avoidance control unit 105 and repeats the collision detection process.

Then, if a free entry can be detected for the target MAC address before a free space is exhausted in the FILO buffer 104, the collision detection unit 111 outputs the information on the detected free entry and the target MAC address to the registration unit 112 and ends the collision detection process.

In contrast, if a free space is exhausted in the FILO buffer 104 when the collision detection process is repeatedly performed, the collision detection unit 111 instructs, as a notification, the collision address temporary management unit 103 to make the FILO buffer 104 empty. Then, the collision detection unit 111 notifies the registration unit 112 that the registration of the reception MAC address is not available and ends the registration process for the MAC address. The collision detection unit 111 mentioned here corresponds to an example of a "detecting unit".

If a free entry is detected for the reception MAC address, the registration unit 112 receives an input of the information on the free entry and the reception MAC address from the collision detection unit 111. Then, the registration unit 112 registers the reception MAC address in the free entry in the MAC address table 20 and ends the registration process of the MAC address.

If a collision occurs in all of the banks related to the reception MAC address, the registration unit 112 receives an input of the reception MAC address from the collision detection unit 111. Then, the registration unit 112 stores the reception MAC address in the storage area (not illustrated) included in the own registration unit 112 and hold the reception MAC address.

Thereafter, if a free entry related to the target MAC address is detected, the registration unit 112 receives an input of the information on the free entry and the target MAC address from the collision detection unit 111. Then, the registration unit 112 registers the target MAC address in the free entry in the MAC address table 20.

Subsequently, the table control management unit 101 performs an expelling process that sequentially registers, in free entries, the MAC addresses indicated by the last registration entry information stored in the FILO buffer 104. In the following, the expelling process will be described in detail.

The registration unit 112 instructs the collision address temporary management unit 103 to delete the last registration entry information. The last registration entry information mentioned here is entry information that is stored last from among the pieces of entry information held by the FILO buffer 104. In this example, first, the entry information indicating the entry in which a free entry has been detected and that is associated with the target MAC address.

Furthermore, the registration unit 112 deletes the registration content of the original registration destination entry (hereinafter, sometimes be referred to as an "original entry") of the registered target MAC address and makes the original entry a free entry. Then, the registration unit 112 notifies the free entry management unit 106 of the information on the entry that becomes the free entry. In the information on the free entry that is sent to the free entry management unit 106 as a notification, for example, the location of the free entry in the MAC address table 20 is included.

The registration unit 112 notifies the collision address temporary management unit 103 of the transmission of the last registration entry information. Then, the registration unit 112 acquires the last registration entry information from the collision address temporary management unit 103. Hereinafter, the MAC address indicated by the last registration entry information acquired by the registration unit 112 from the collision address temporary management unit 103 is referred to as an "expelled MAC address".

Then, the registration unit 112 acquires the information on the free entry from the free entry management unit 106. Thereafter, the registration unit 112 registers the expelled MAC address in the free entry that is notified from the free entry management unit 106.

Furthermore, the registration unit 112 acquires the information on the location of the entry from the acquired last registration entry information. The location of this entry corresponds to the location of the original entry of the expelled MAC address. Then, the registration unit 112 extracts, on the basis of the acquired location of the entry, the original entry of the expelled MAC address in the MAC address table 20. Thereafter, the registration unit 112 deletes the content of the registration of the original entry of the expelled MAC address and sets the original entry to a free entry. Then, the registration unit 112 notifies the free entry management unit 106 of the information on the original entry that becomes the free entry.

Furthermore, the registration unit 112 instructs the collision address temporary management unit 103 to delete the last registration entry information from the FILO buffer 104. Consequently, the entry information of the registered expelled MAC address is deleted from the FILO buffer 104.

Then, the registration unit 112 determines whether the FILO buffer 104 becomes empty. If the FILO buffer 104 does not become empty, the registration unit 112 repeats the expelling process until the FILO buffer 104 becomes empty.

If the FILO buffer 104 becomes empty, the registration unit 112 acquires the information on the free entry stored in the free entry management unit 106. Then, the registration unit 112 stores the reception MAC address held by the own registration unit 112 in the free entry and ends the expelling process.

Thereafter, the registration unit 112 notifies the registration result output unit 107 of the completion of the registration of the reception MAC address. Consequently, the table control management unit 101 ends the process of registering the MAC address. The target MAC address and the expelled MAC address that is associated with the target MAC address correspond to examples of "the second and the third MAC addresses".

The hash unit 102 has the information on the priority of each of the banks in the MAC address table 20. Furthermore, the hash unit 102 has a hash expression associated with each of the banks in the MAC address table 20. The hash expression differs for each bank. Because the hash expression differs for each bank, when a MAC address is registered by using a hash calculation, even if the MAC address is not able to be registered in a certain bank, the MAC address can be registered in another bank.

The hash unit 102 receives an instruction to perform the hash calculation of the reception MAC address or the target MAC address from the collision detection unit 111. The hash unit 102 selects a bank on the basis of the priority of each of the banks. Then, the hash unit 102 performs the hash calculation on the specified MAC address by using the hash expression in accordance with the selected bank. Thereafter, the hash unit 102 outputs the calculation result of the hash calculation to the collision detection unit 111.

The FILO buffer 104 is a first in last out buffer that outputs data in the order in which the latest stored data is output first. Namely, in the FILO buffer 104, from among the pieces of the stored entry information, the entry information that was stored last is output first. However, another storage device other than the FILO buffer 104 may also be used as long as the storage device can acquire data in reverse chronological order of data that is stored. For example, a storage device that stores therein the storage time of data together with the data and that outputs, in accordance with a request for data to be acquired, data that has the oldest storage time may also be used.

The collision address temporary management unit 103 receives an instruction to store the entry information in the FILO buffer 104 from the collision detection unit 111. Then, the collision address temporary management unit 103 stores, in the FILO buffer 104, the entry information received from the collision detection unit 111.

Furthermore, the collision address temporary management unit 103 receives an instruction to acquire the last registration entry information from the registration unit 112. Then, the collision address temporary management unit 103 reads the entry information from the FILO buffer 104 and outputs the read entry to the registration unit 112.

Furthermore, the collision address temporary management unit 103 receives, from the registration unit 112, an instruction to delete the last registration entry information from the FILO buffer 104. Then, the collision address temporary management unit 103 deletes the top entry information in the FILO buffer 104.

Furthermore, the collision address temporary management unit 103 receives, from the collision detection unit 111, an instruction to empty the FILO buffer 104 empty. Then, the collision address temporary management unit 103 empties the FILO buffer 104.

The collision avoidance control unit 105 has the information on the priority of each of the banks in the MAC address table 20. The collision avoidance control unit 105 receives, from the collision detection unit 111, an input of information on the reception MAC address, the occurrence of the collision of the target MAC address, and the entry of each bank in which the collision has occurred.

If a collision of the reception MAC address occurs, the collision avoidance control unit 105 extracts the entry that is included in the bank that has the highest priority and that is located in the collision destination. Furthermore, if a collision of the target MAC address occurs, the collision avoidance control unit 105 extracts the entry that is located in the collision destination and that is included in the bank, which has the second highest priority subsequent to the bank that includes therein the entry in which the target MAC address is registered. Furthermore, if a bank that has the lowest priority is used, the collision avoidance control unit 105 then returns to the bank that has the highest priority and extracts an entry. Then, the collision avoidance control unit 105 outputs the information on the extracted entries to the collision detection unit 111.

Here, in the first embodiment, in order to evenly use the banks, a bank is selected such that entries are extracted while the priority is sequentially changed to a lower level; however, the selection of a bank is not limited to this. For example, the collision avoidance control unit 105 may also select the bank that has the highest priority from among the banks other than the bank that includes therein the entry in which the target MAC address is registered. In this case, a lack of balance may possibly occur in the selected banks. The collision avoidance control unit 105 mentioned here corresponds to an example of an "acquiring unit".

The free entry management unit 106 acquires and holds the information on the free entry from the registration unit 112. When the free entry management unit 106 receives a transmission request for the information on the free entry from the registration unit 112, the free entry management unit 106 sends the information on the free entry that is held to the registration unit 112 and then deletes the information on the holding free entry.

The registration result output unit 107 receives, from the registration unit 112, a notification that the registration of the reception MAC address is not available. Then, the registration result output unit 107 outputs, to the control terminal 3, the notification indicating that the registration of the reception MAC address is not available and notifies a user that the registration of the reception MAC address is not available.

Furthermore, the registration result output unit 107 receives, from the registration unit 112, a notification indicating that the registration of the reception MAC address has been completed. Then, the registration result output unit 107 outputs, to the control terminal 3, the notification indicating that the registration of the reception MAC address has been completed and notifies the user that the registration of the reception MAC address has been completed.

If the control terminal 3 receives the notification indicating that the registration of the reception MAC address is not available from the registration result output unit 107, the control terminal 3 notifies the user that the registration of the reception MAC address is not available by, for example, displaying the content of the notification on a monitor. Furthermore, when the control terminal 3 receives the notification indicating that the registration of the reception MAC address has been completed from the registration result output unit 107, the control terminal 3 notifies the user that the registration of the reception MAC address has been completed by, for example, displaying the content of the notification of the monitor.

Figure 6:
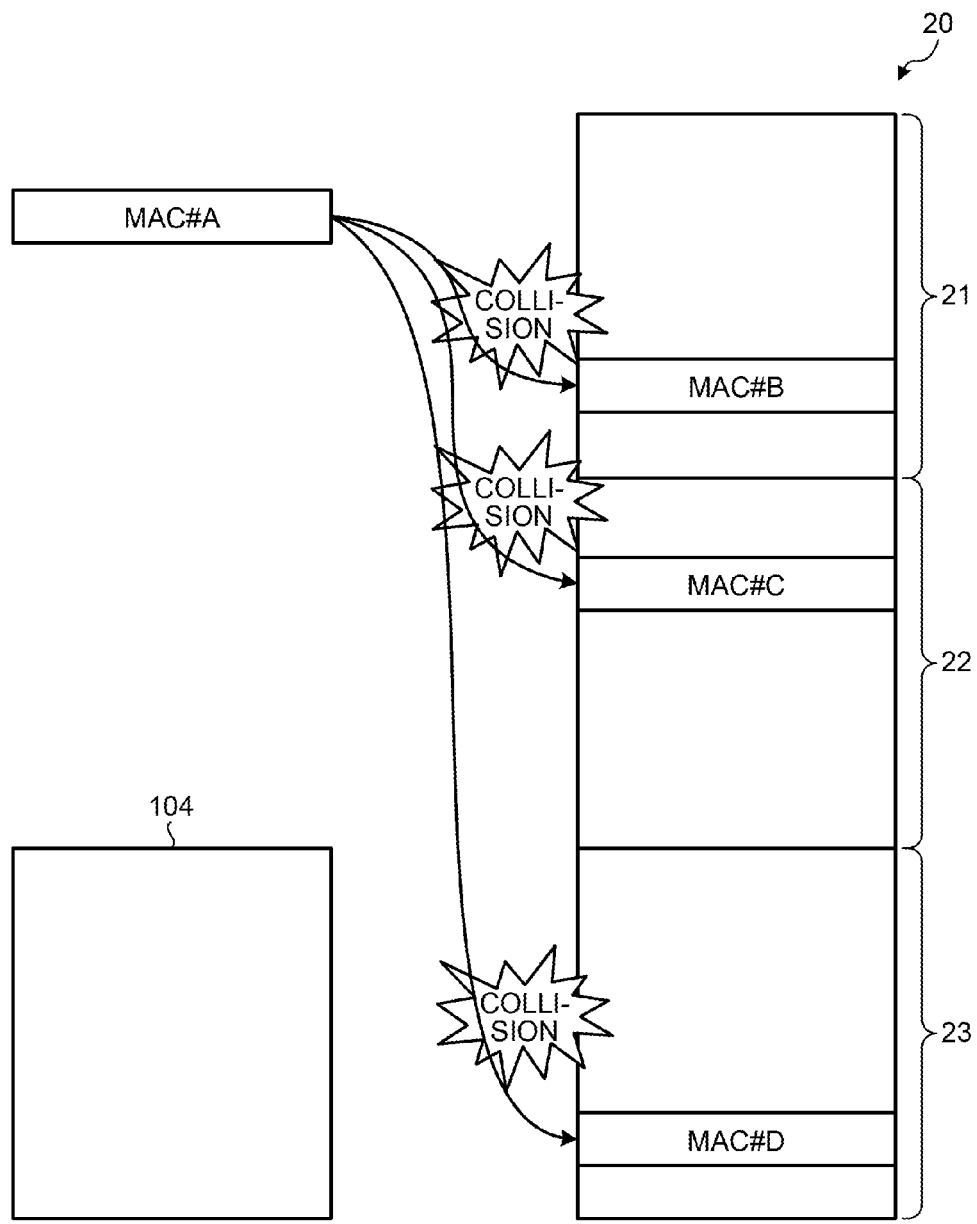
FIG. 6 is a schematic diagram illustrating a state of a collision detection process performed by using a reception MAC address.
Figure 7:
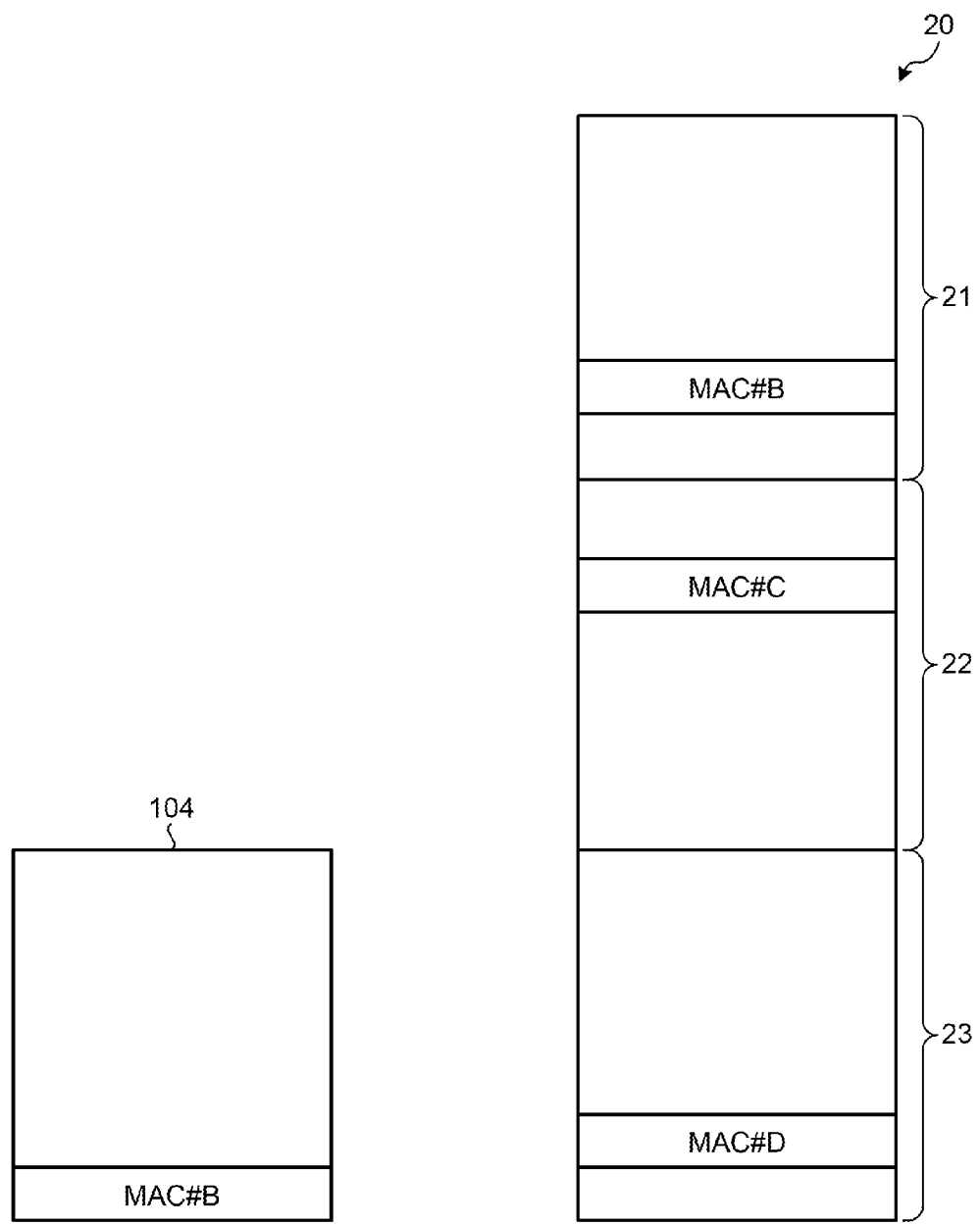
FIG. 7 is a schematic diagram illustrating a state in which a target MAC address is stored in a FILO buffer.
Figure 8:
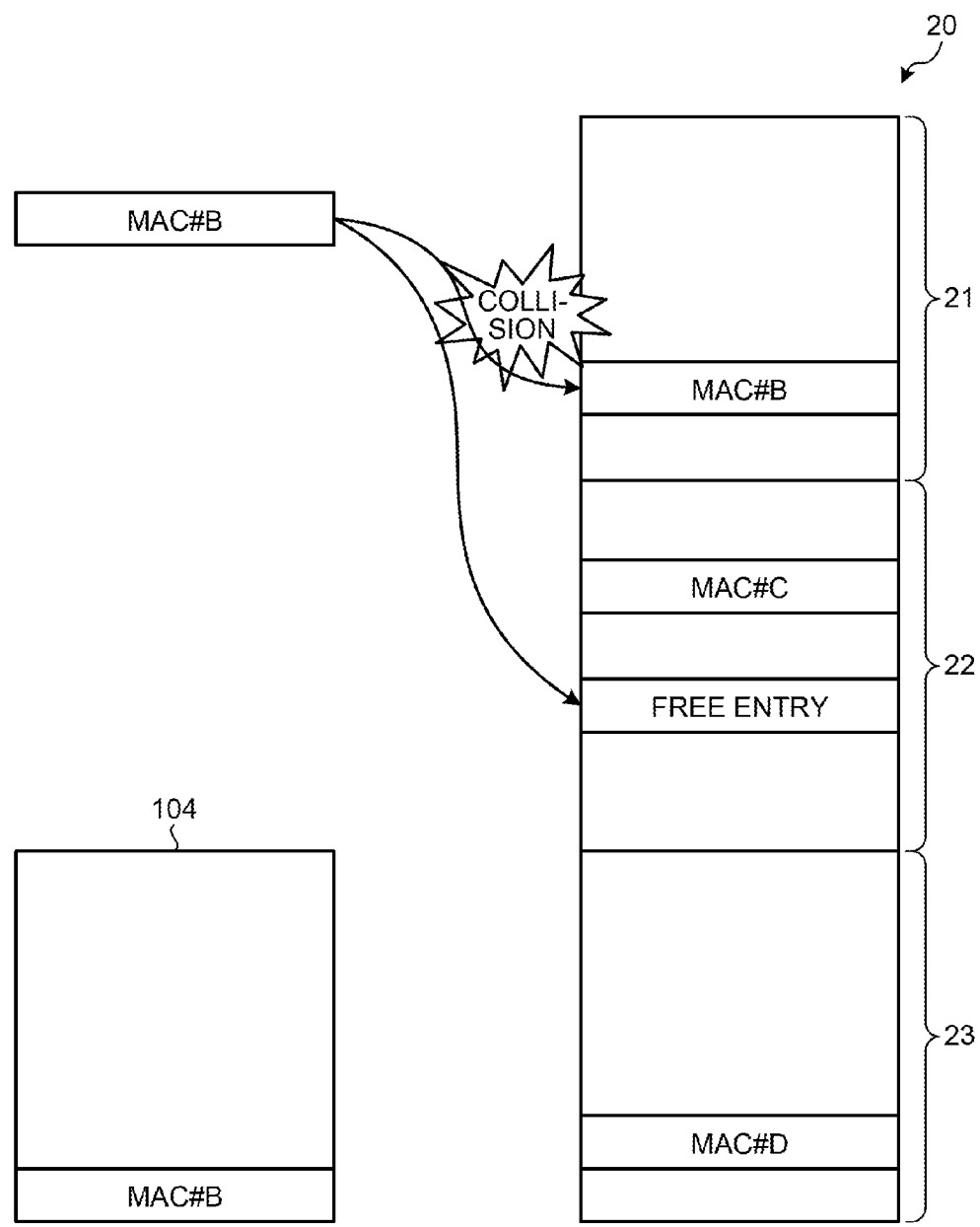
FIG. 8 is a schematic diagram illustrating a state of the collision detection process performed by using a target MAC address.
Figure 9:
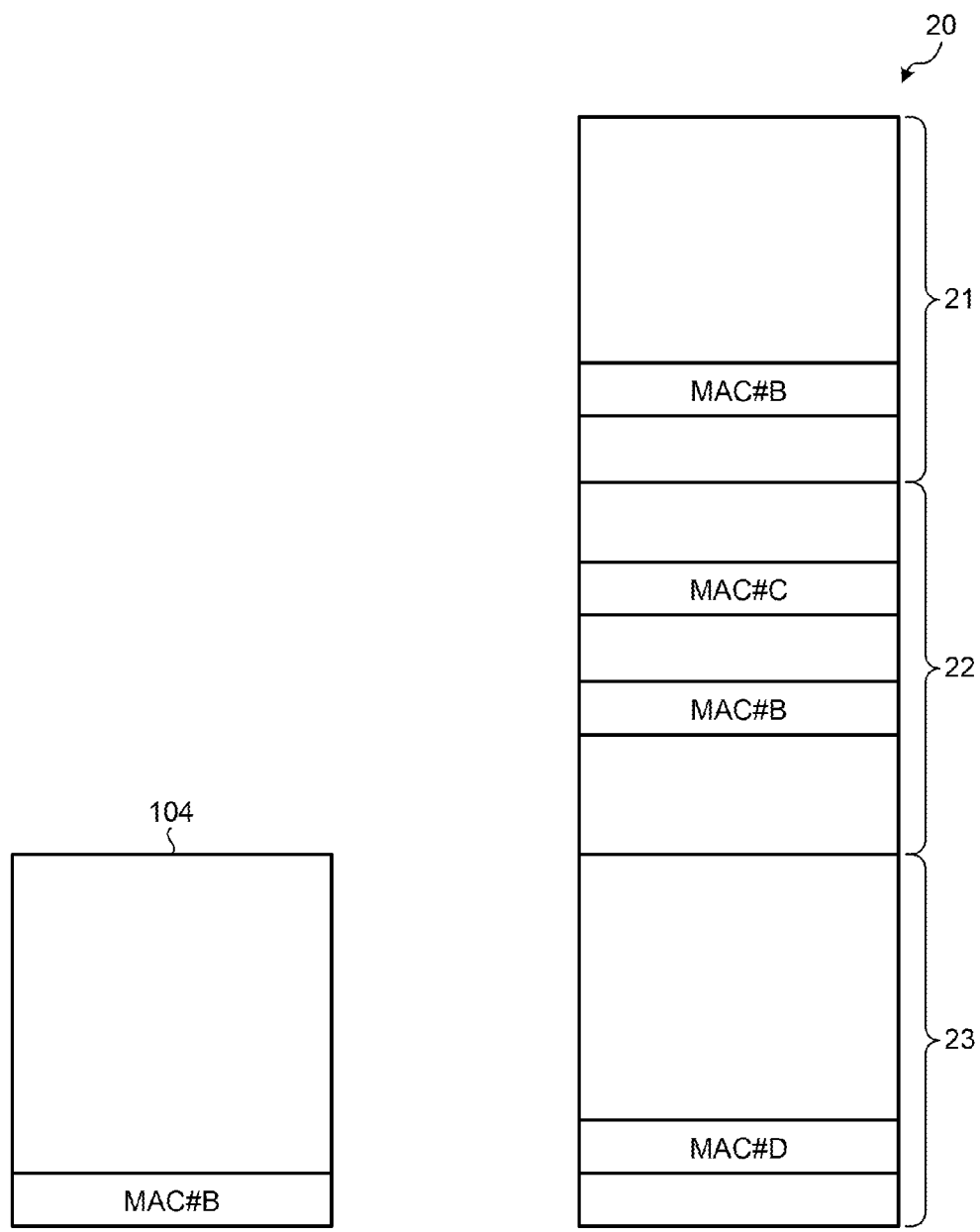
FIG. 9 is a schematic diagram illustrating a state in which the target MAC address is stored in a detected free entry.
Figure 10:
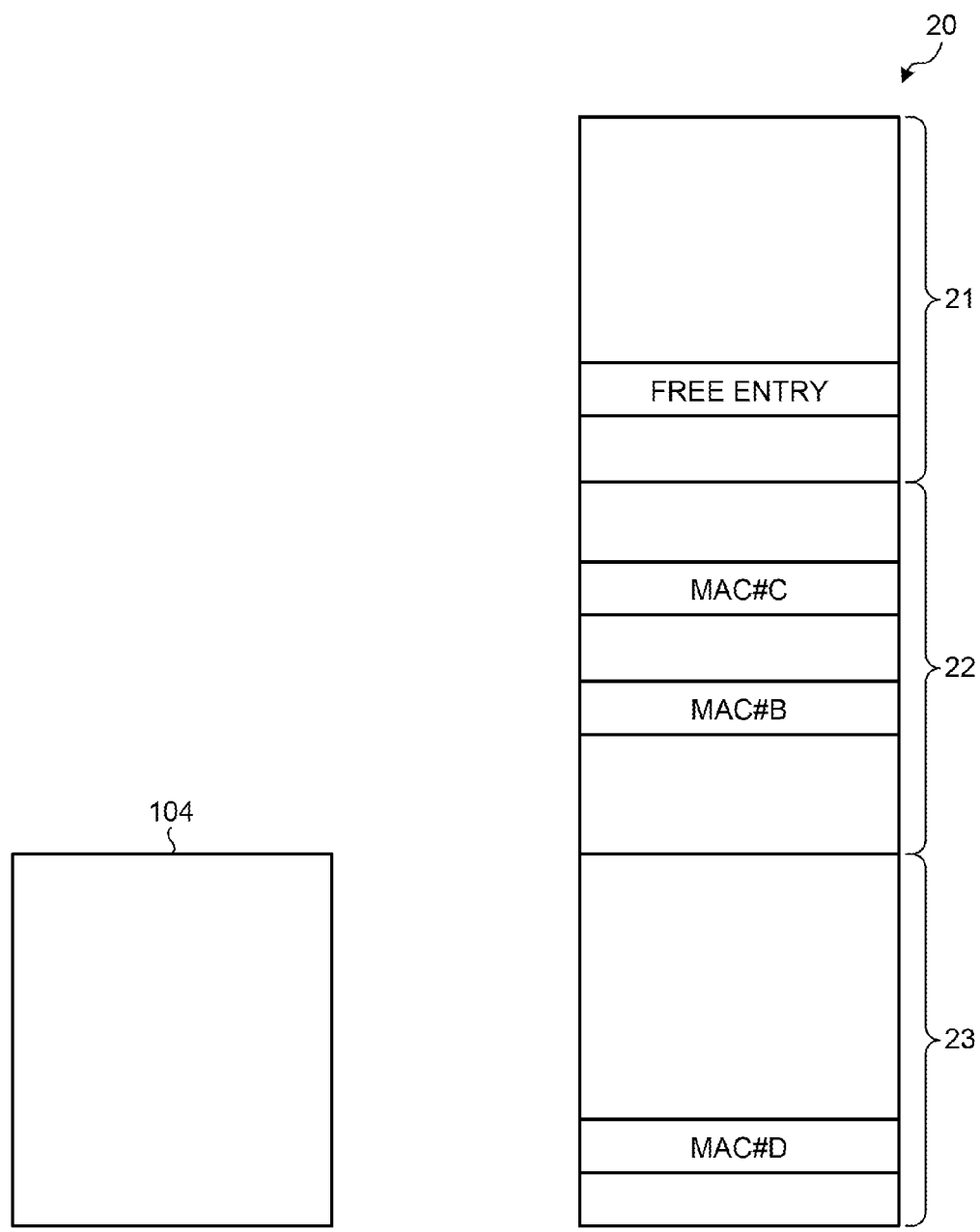
FIG. 10 is a schematic diagram illustrating a state in which information on the target MAC address is deleted from the original entry and the FILO buffer.
Figure 11:
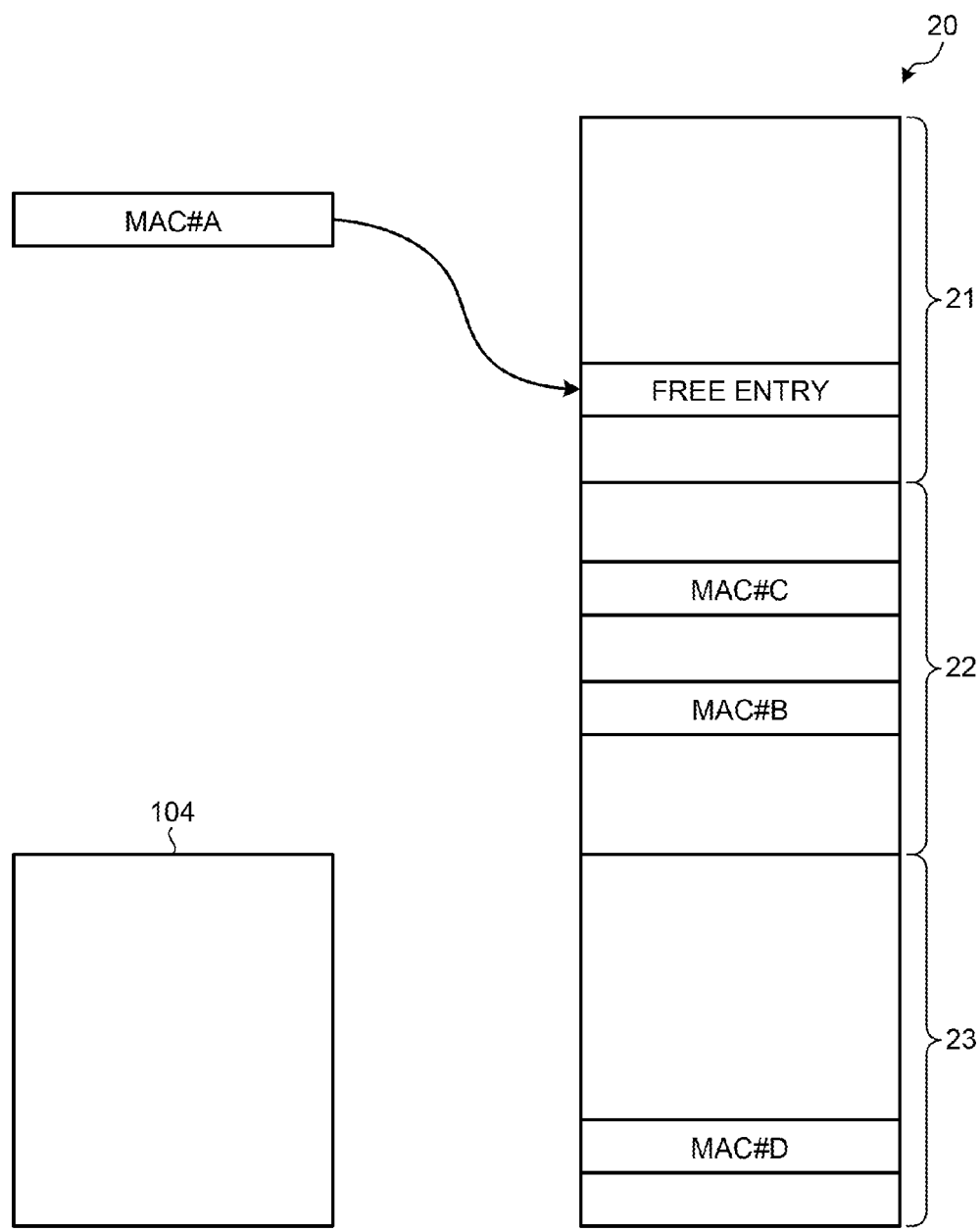
FIG. 11 is a schematic diagram illustrating a state of an expelling process performed on the reception MAC address.
Figure 12:
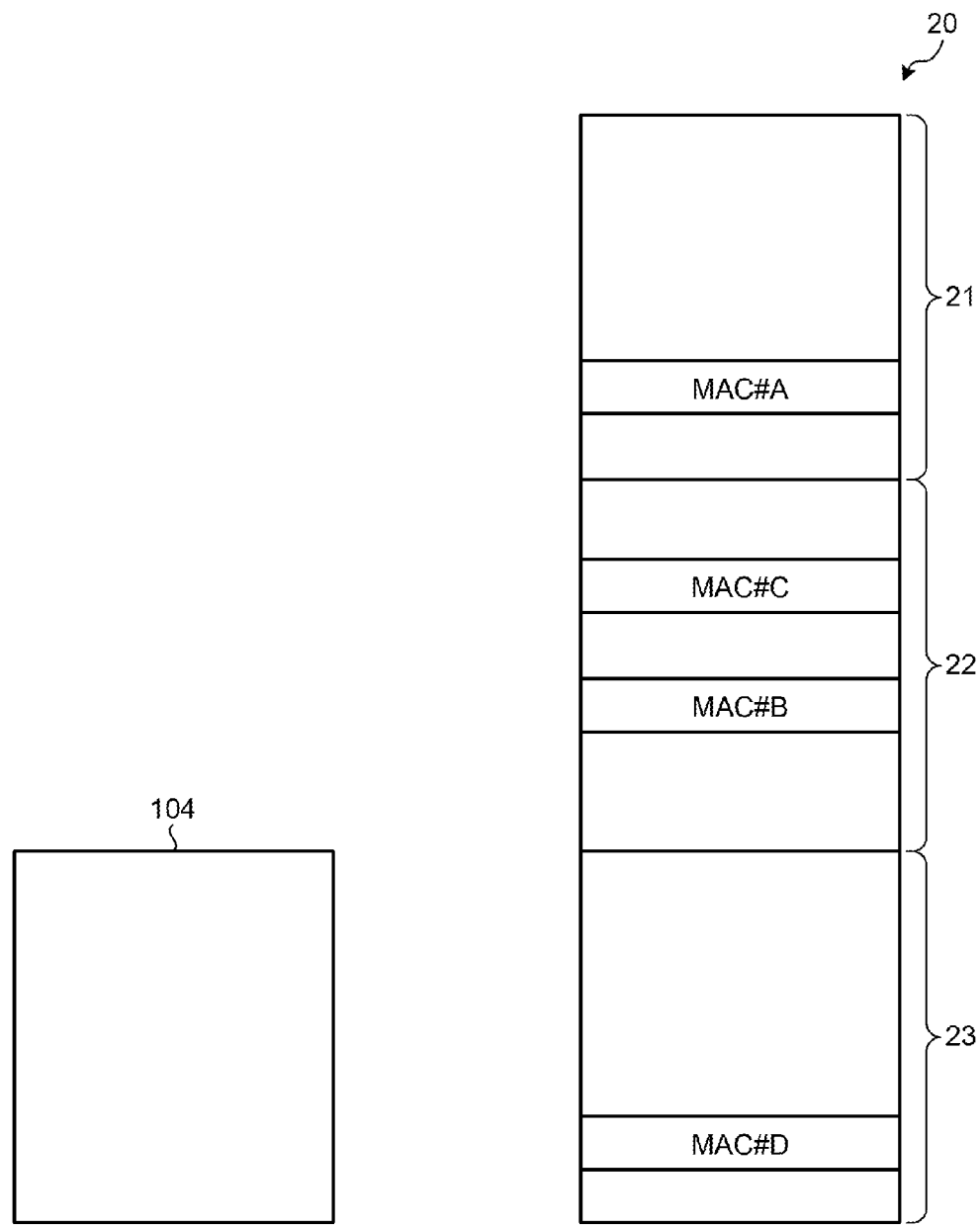
FIG. 12 is a schematic diagram illustrating a state after the completion of a registration process performed on each of the MAC addresses.

In the following, the MAC address registration process performed by the communication device according to the first embodiment will be described with reference to FIGS. 6 to 12. Here, a description will be given of a case in which a free entry is detected in a first target MAC address. FIG. 6 is a schematic diagram illustrating a state of a collision detection process performed by using a reception MAC address. FIG. 7 is a schematic diagram illustrating a state in which a target MAC address is stored in a FILO buffer. FIG. 8 is a schematic diagram illustrating a state of the collision detection process performed by using a target MAC address. FIG. 9 is a schematic diagram illustrating a state in which the target MAC address is stored in a detected free entry. FIG. 10 is a schematic diagram illustrating a state in which information on the target MAC address is deleted from the original entry and the FILO buffer. FIG. 11 is a schematic diagram illustrating a state of an expelling process performed on the reception MAC address. FIG. 12 is a schematic diagram illustrating a state after the completion of the registration process performed on each of the MAC addresses. In the following, a description will be given of a case in which the MAC address table 20 is divided into three banks, i.e., banks 21 to 23. Furthermore, for convenience of explanation, the entry information stored in the FILO buffer 104 is also represented by a MAC address. Furthermore, in the following, a description will be given of a case in which the bank 21 has the highest priority, the bank 22 has the second highest priority, and the bank 23 has the lowest priority.

As illustrated in FIG. 6, the collision detection unit 111 checks the entry in each of the banks 21 to 23 that are associated with the calculation result obtained by using the hash expression performed, on the MAC#A, for each of the banks 21 to 23 and checks that a collision has occurred in all of the banks 21 to 23. In this state, the FILO buffer 104 is empty.

Thus, the collision detection unit 111 receives, from the collision avoidance control unit 105, an instruction to set, as the target MAC address, the entry that stores therein the MAC#B that is included in the bank 21 having the highest priority and that comes into collision with the MAC#A. Then, in response to the instruction received from the collision detection unit 111, as illustrated in FIG. 7, the collision address temporary management unit 103 stores, in the FILO buffer 104, the entry information on the MAC#B that is the target MAC address.

Then, as illustrated in FIG. 8, the collision detection unit 111 sequentially checks, for the MAC#B that is the target MAC address, the entry of each of the banks 21 to 23 associated with the calculation result obtained by using the hash expression for each of the banks 21 to 23. Here, the calculation result of the MAC#B comes into collision with the entry that is included in the bank 21 and in which the MAC#B is registered. Thus, the collision detection unit 111 checks the bank 22 that has the second highest priority and detects that the entry associated with the calculation result of the hash calculation of the MAC#B is a free entry. Consequently, the collision detection process performed by the collision detection unit 111 has been ended.

Thus, as illustrated in FIG. 9, the registration unit 112 registers the MAC#B in the detected free entry. In this state, two entries in each of which the MAC#B is registered are present in the MAC address table 20. Furthermore, the entry information on the MAC#B is stored in the top of the FILO buffer 104.

Thus, as illustrated in FIG. 10, the registration unit 112 deletes the information on the original entry of the target MAC address in the MAC address table 20 and sets the subject entry to a free entry. At this time, the free entry management unit 106 stores therein the information on the free entry. Furthermore, in response to the instruction received from the registration unit 112, the collision address temporary management unit 103 deletes the entry information on the MAC#B that is present in the top in the FILO buffer 104. Then, the registration unit 112 determines whether the FILO buffer 104 becomes empty. In this case, the FILO buffer 104 becomes empty.

Thus, as illustrated in FIG. 11, the registration unit 112 registers the MAC#A stored in the registration unit 112 by itself into the free entry that is stored in the free entry management unit 106. Consequently, the registration process has been completed and the MAC address table 20 and the FILO buffer 104 become the state illustrated in the FIG.

12. In this way, the registration process of the MAC address performed when a free entry is detected in a first target MAC address has been completed.

Figure 13:
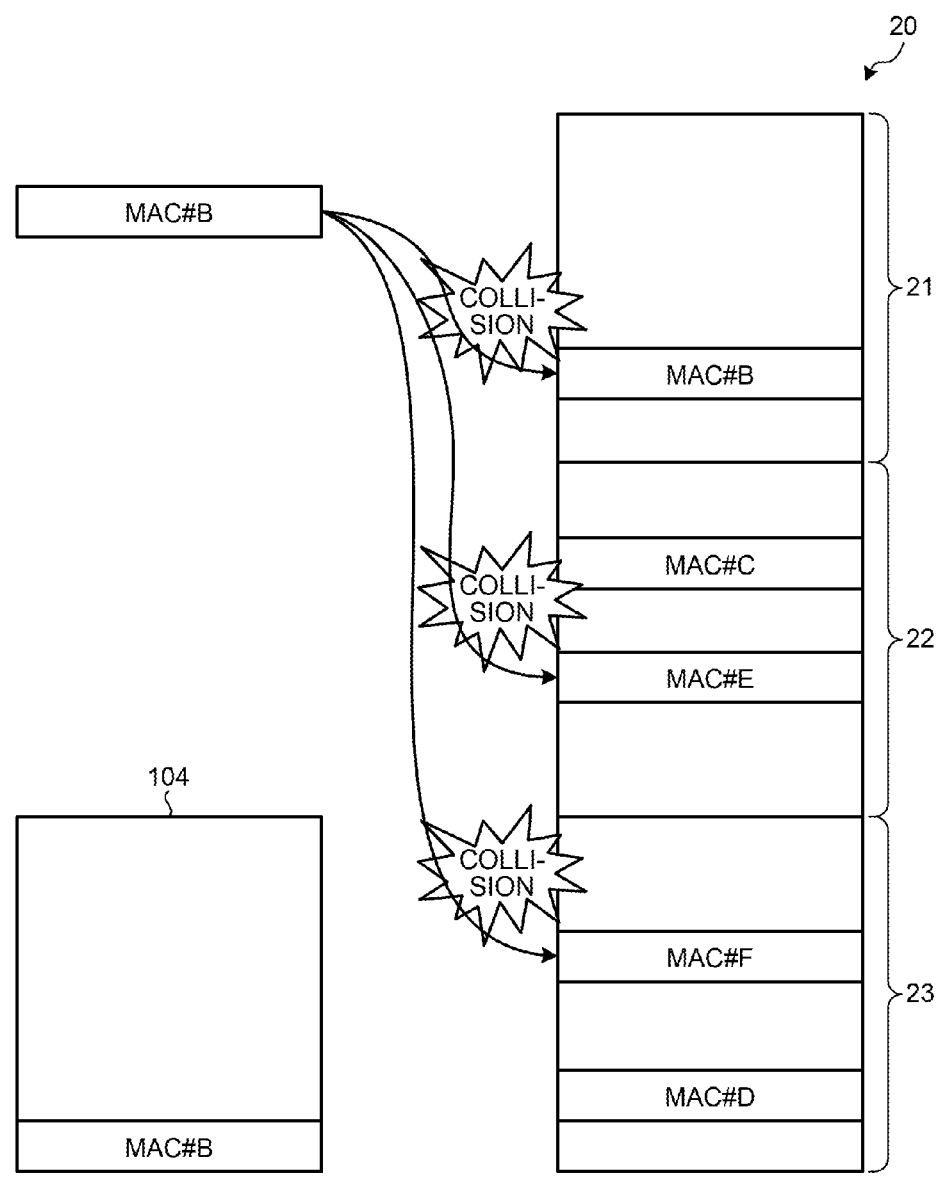
FIG. 13 is a schematic diagram illustrating a state of the collision detection process performed by using a first target MAC address.
Figure 14:
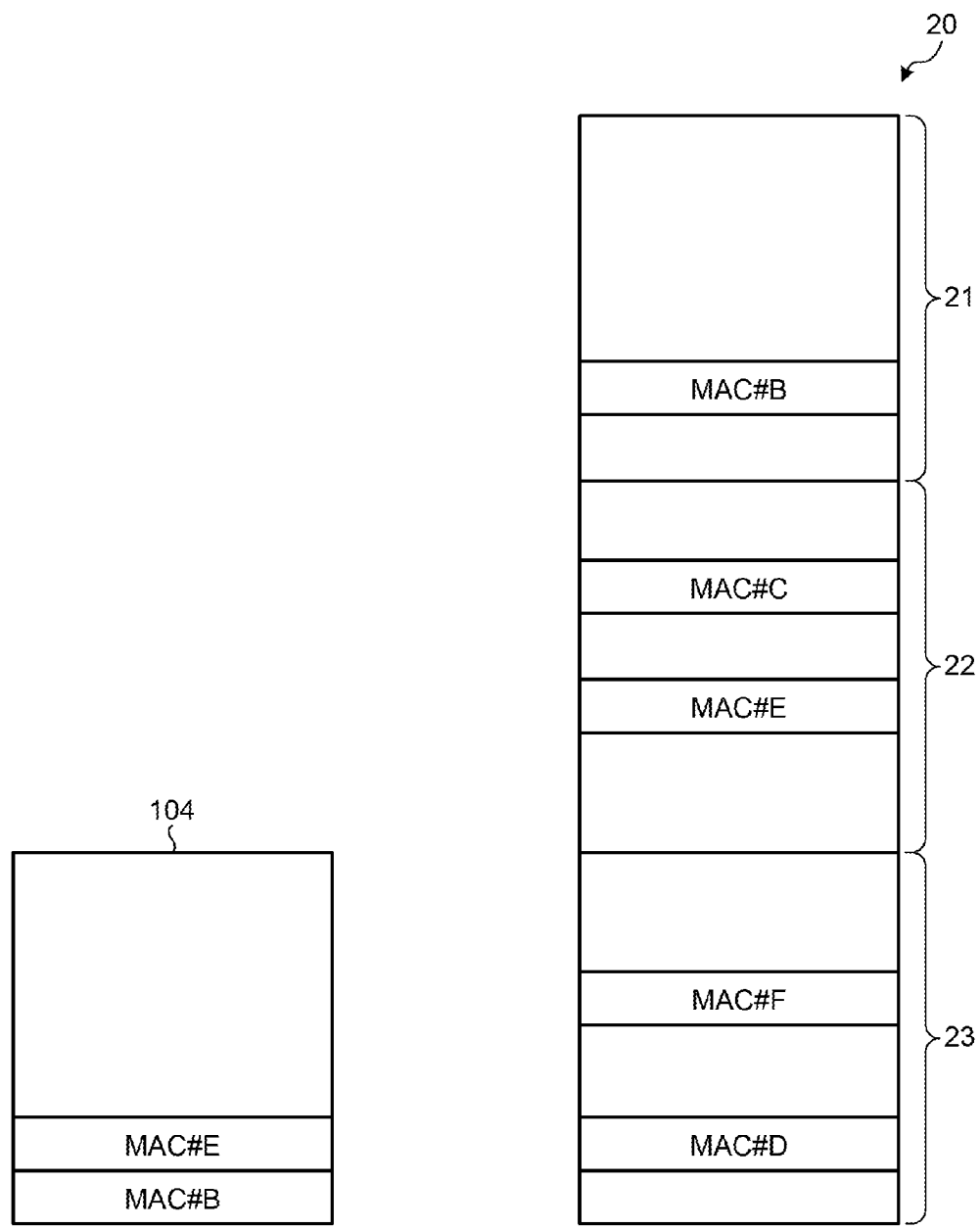
FIG. 14 is a schematic diagram illustrating a state in which a second target MAC address is stored in the FILO buffer.
Figure 15:
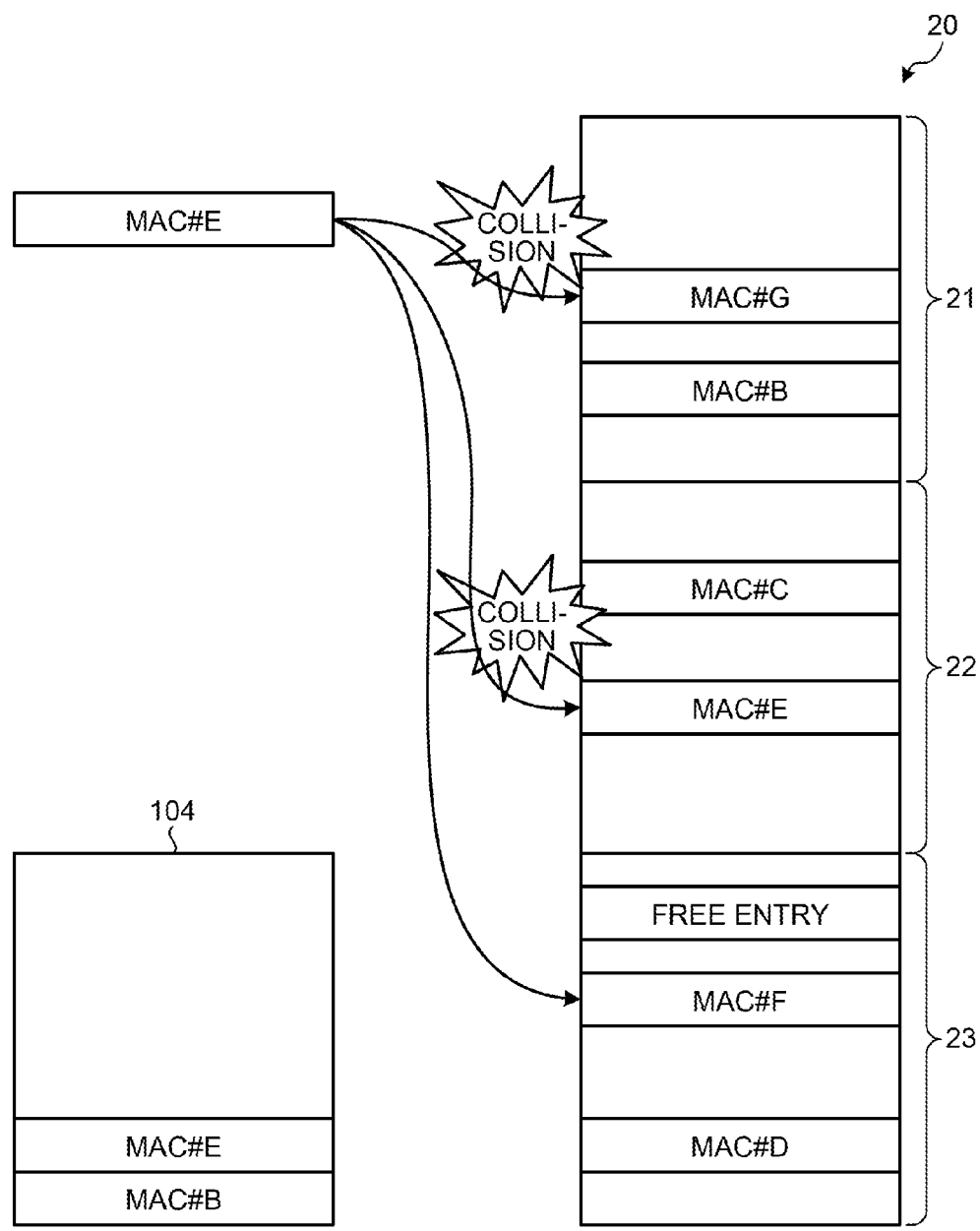
FIG. 15 is a schematic diagram illustrating a state of the collision detection process performed by using the second target MAC address.
Figure 16:
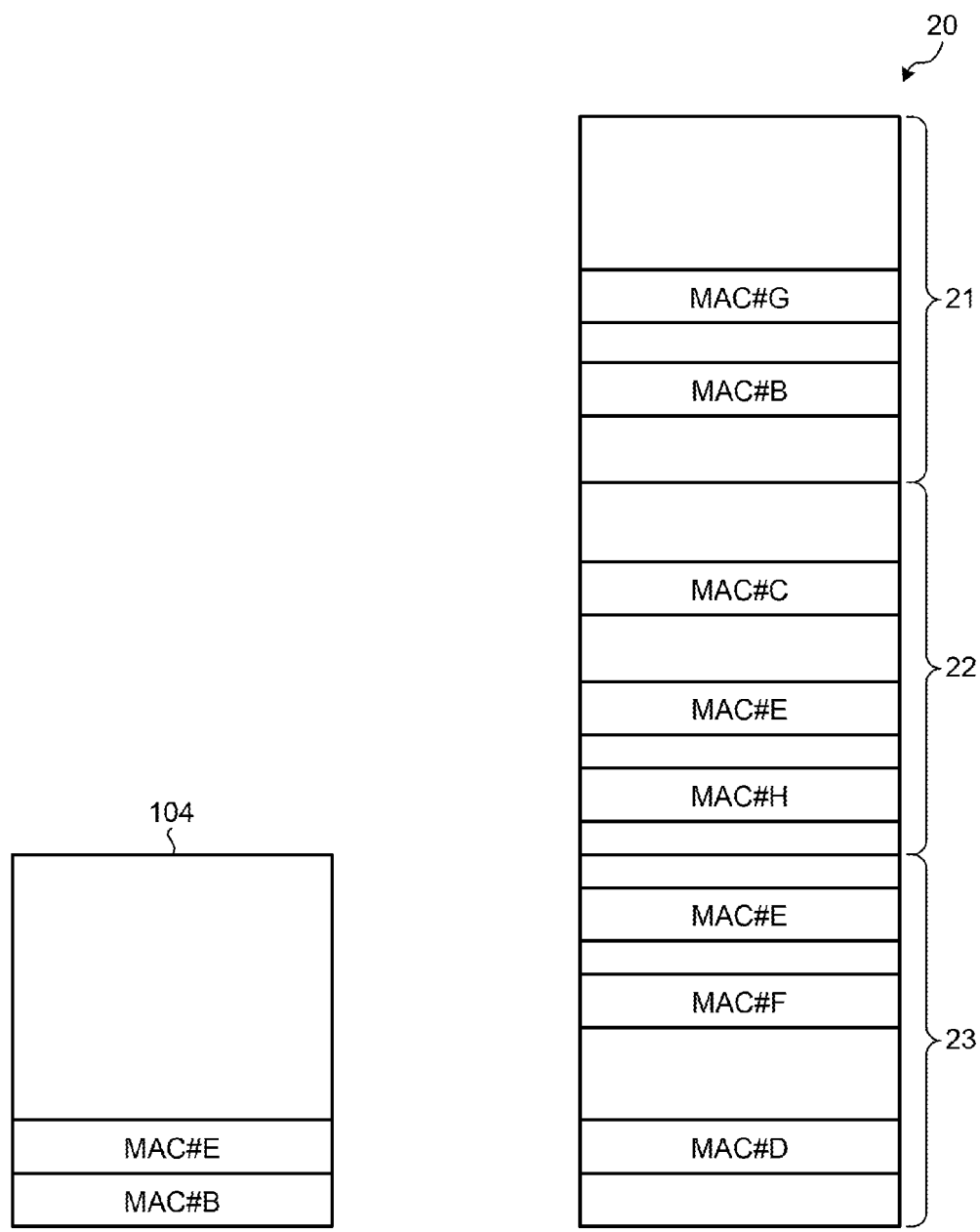
FIG. 16 is a schematic diagram illustrating a state in which the second target MAC address is stored in a detected free entry.
Figure 17:
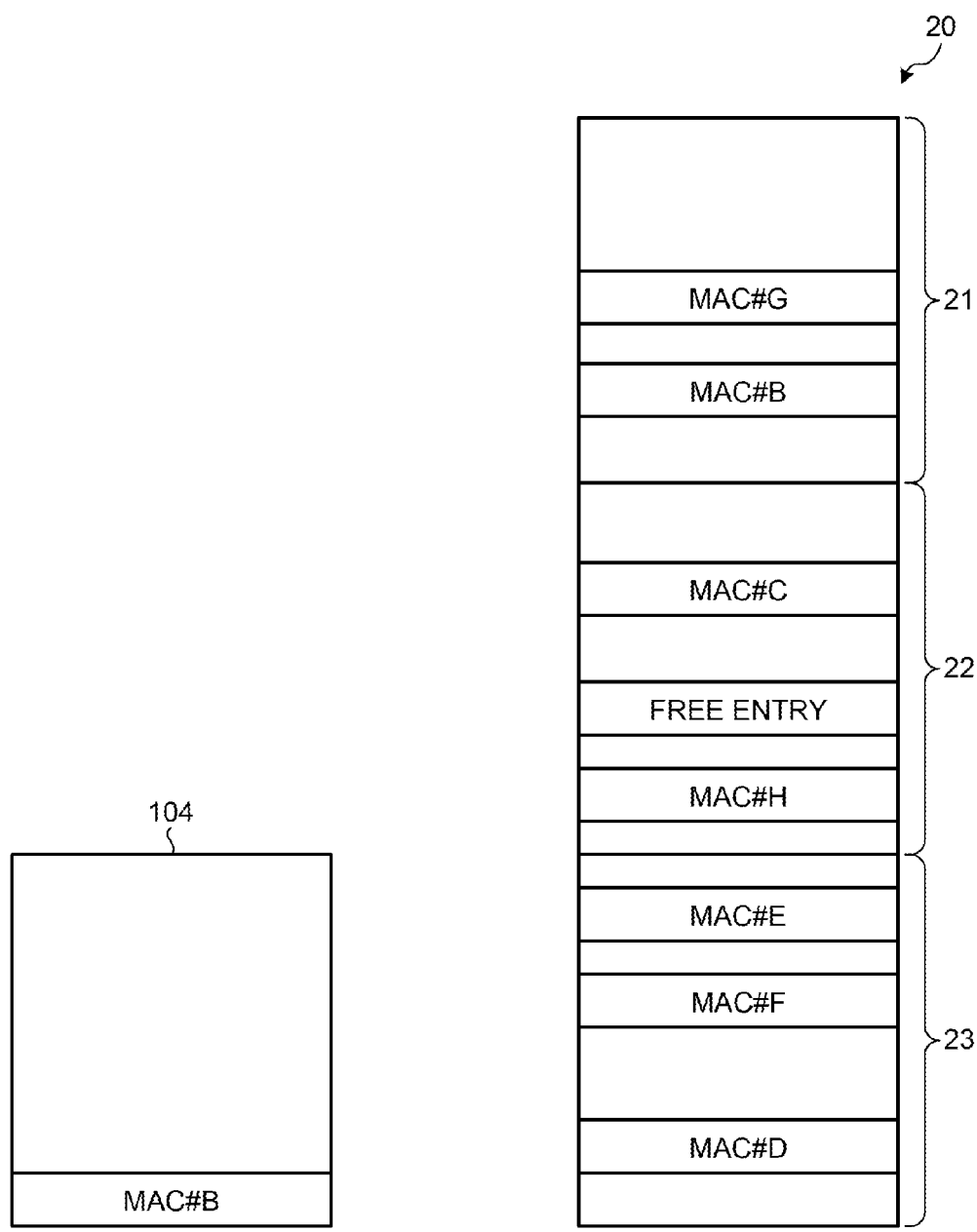
FIG. 17 is a schematic diagram illustrating a state in which the information on the second target MAC address is deleted from the original entry and the FILO buffer.
Figure 18:
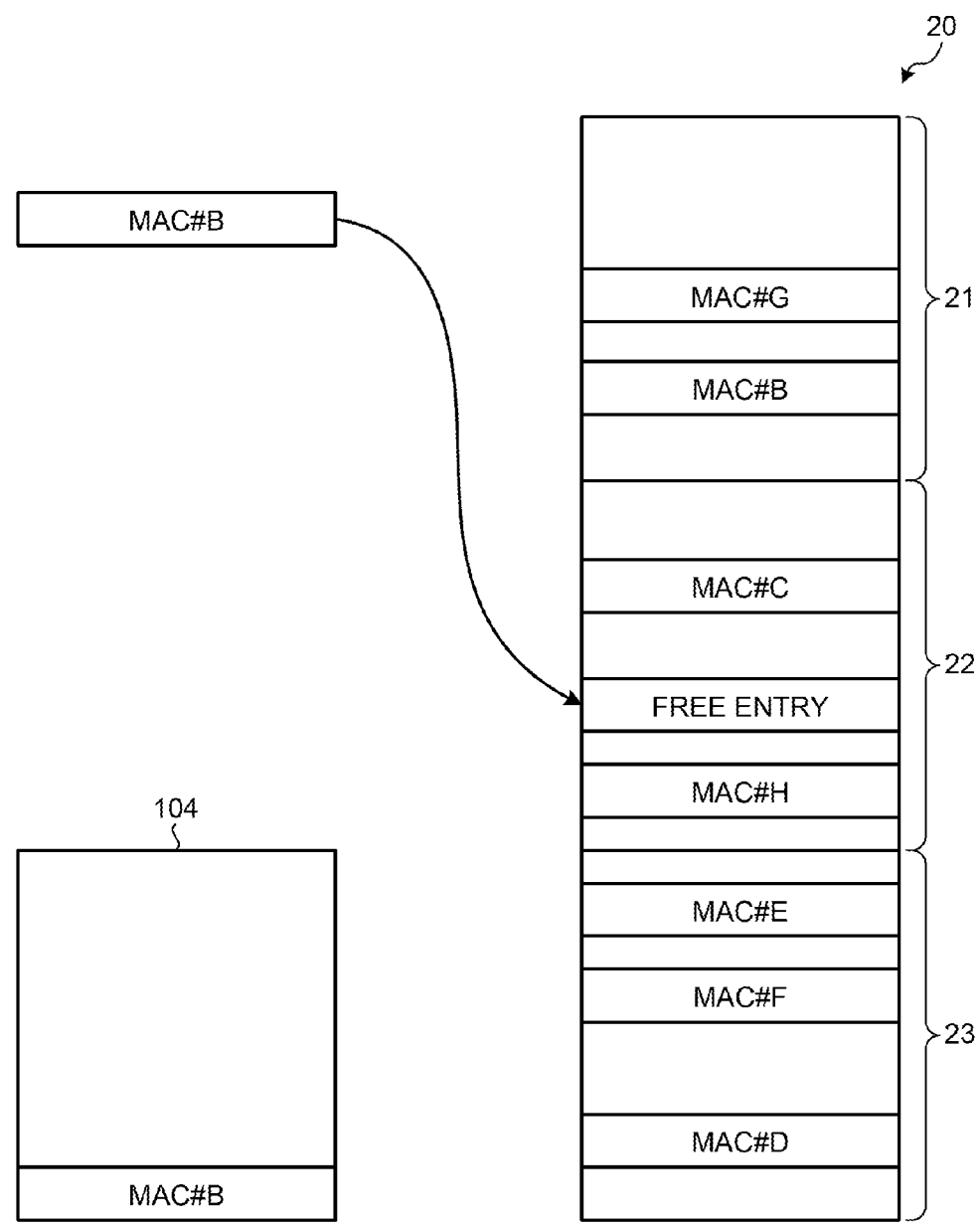
FIG. 18 is a schematic diagram illustrating a state of the expelling process performed on the first target MAC address.
Figure 19:
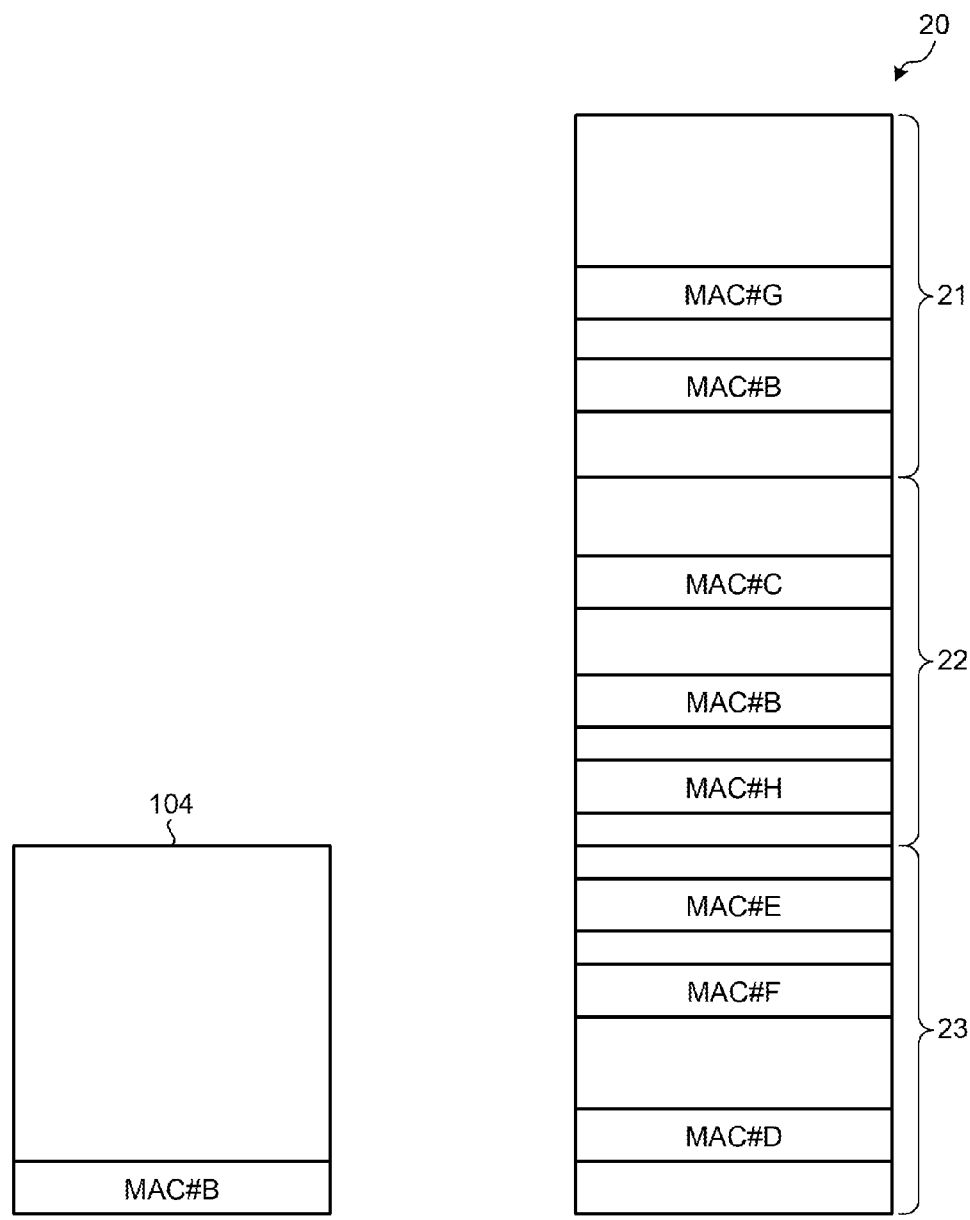
FIG. 19 is a schematic diagram illustrating a state in which the first target MAC address is stored in the free entry by using the expelling process.
Figure 20:
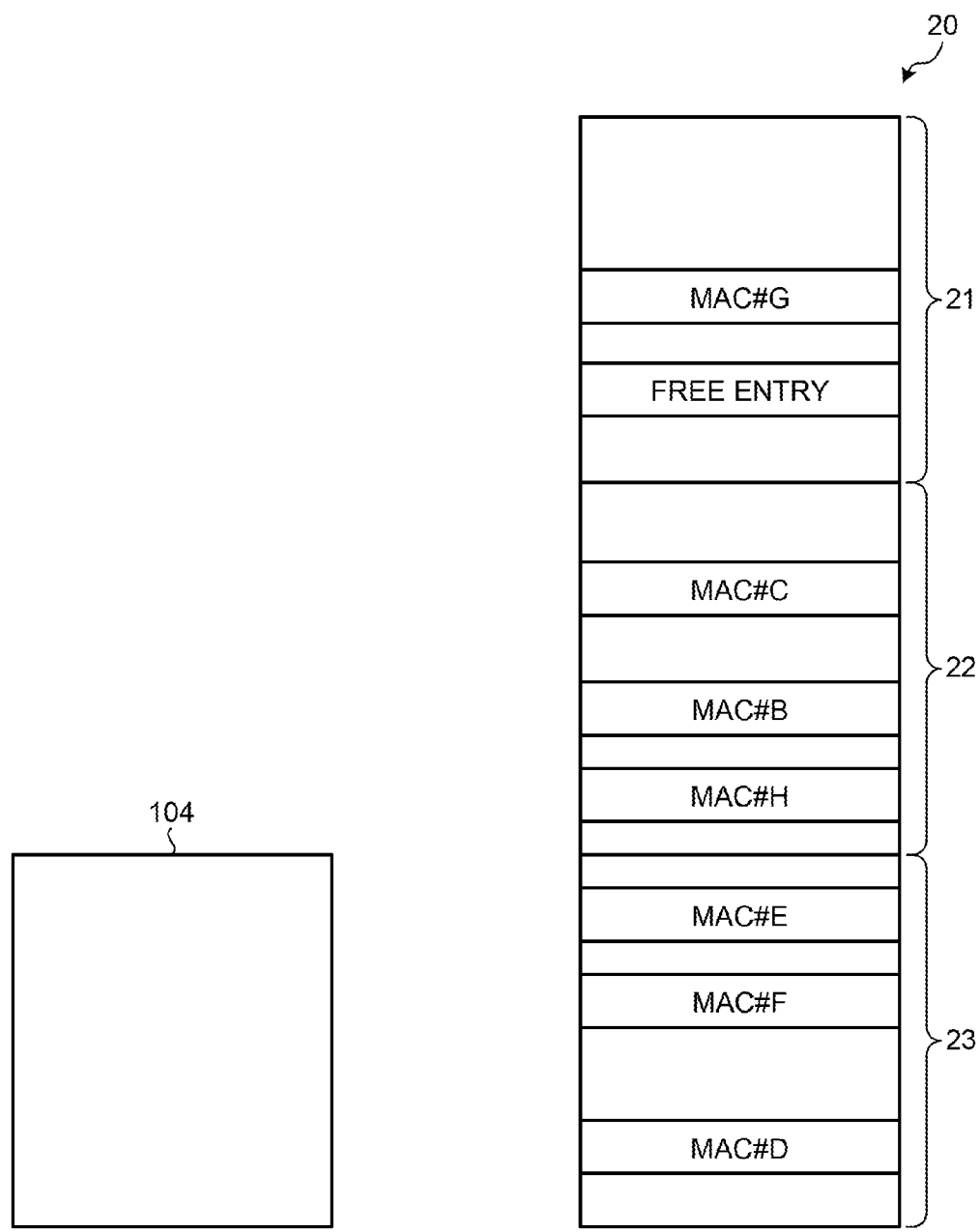
FIG. 20 is a schematic diagram illustrating a state in which the information on the target MAC address is deleted from the original entry and the FILO buffer.
Figure 21:
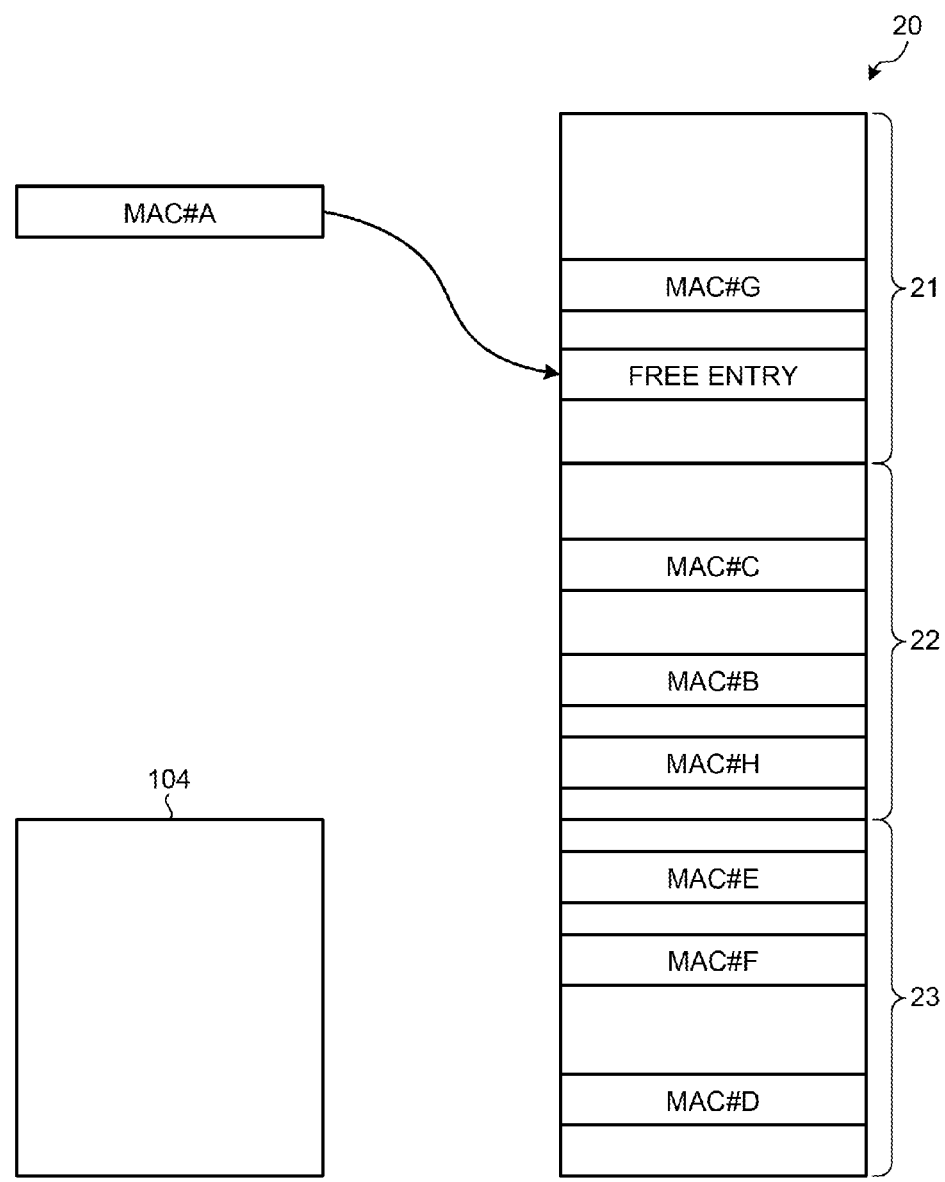
FIG. 21 is a schematic diagram illustrating a state of the expelling process performed on the reception MAC address.
Figure 22:
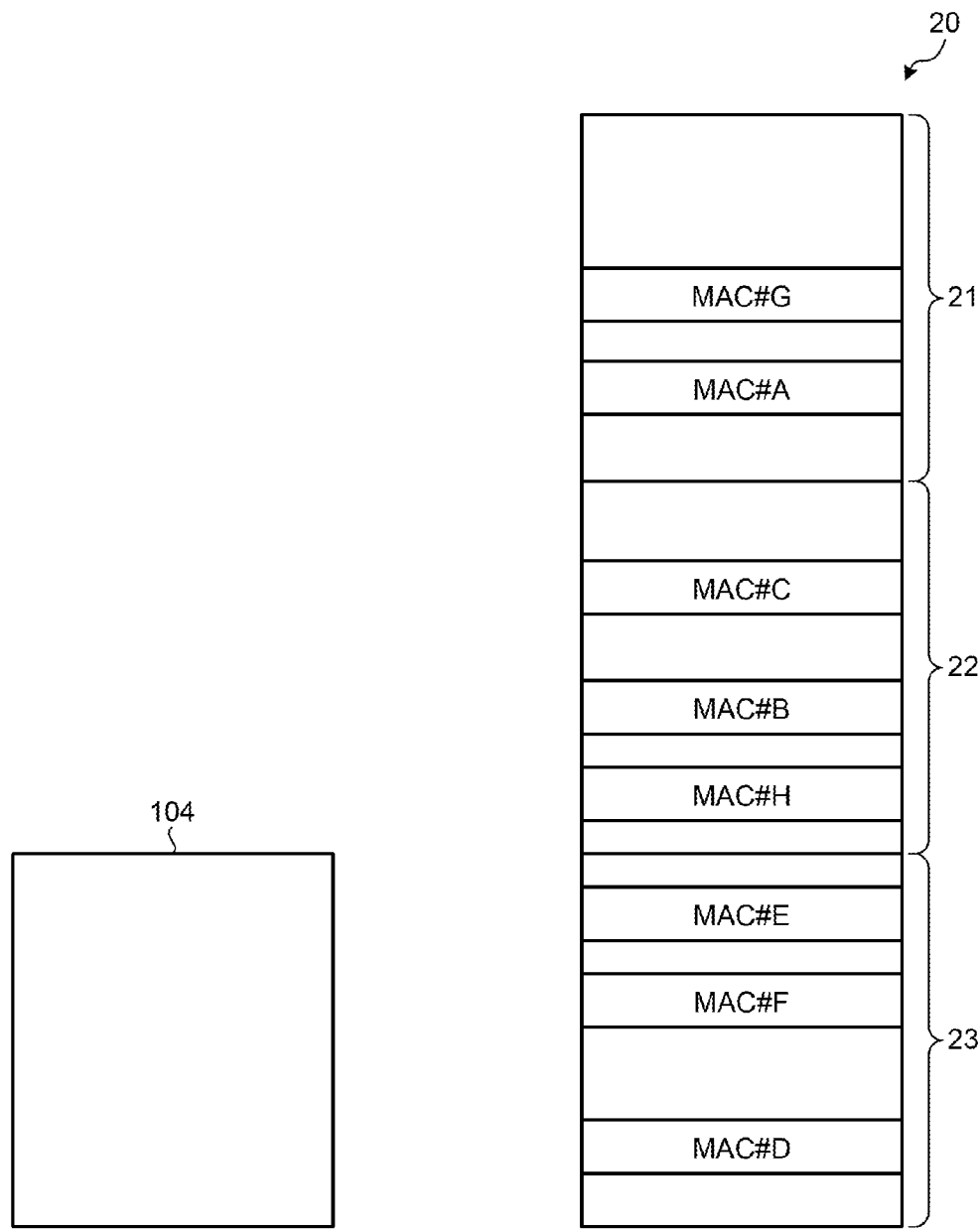
FIG. 22 is a schematic diagram illustrating a state after the completion of the registration process performed on each of the MAC addresses.

In the following, the operation performed when a free entry is not able to be detected in the collision detection process in the first target MAC address will be described with reference to FIGS. 13 to 22. Here, a description will be given with the assumption that the reception MAC address is the MAC#A, the first target MAC address is the MAC#B, and the second target MAC address is the MAC#E. FIG. 13 is a schematic diagram illustrating a state of the collision detection process performed by using a first target MAC address. FIG. 14 is a schematic diagram illustrating a state in which a second target MAC address is stored in the FILO buffer. FIG. 15 is a schematic diagram illustrating a state of the collision detection process performed by using the second target MAC address. FIG. 16 is a schematic diagram illustrating a state in which the second target MAC address is stored in a detected free entry. FIG. 17 is a schematic diagram illustrating a state in which the information on the second target MAC address is deleted from the original entry and the FILO buffer. FIG. 18 is a schematic diagram illustrating a state of the expelling process performed on the first target MAC address. FIG. 19 is a schematic diagram illustrating a state in which the first target MAC address is stored in the free entry by using the expelling process. FIG. 20 is a schematic diagram illustrating a state in which the information on the target MAC address is deleted from the original entry and the FILO buffer. FIG. 21 is a schematic diagram illustrating a state of the expelling process performed on the reception MAC address. FIG. 22 is a schematic diagram illustrating a state after the completion of the registration process performed on each of the MAC addresses.

The collision detection unit 111 performs calculation, for each of the banks 21 to 23 by using the hash expression, on the MAC#B that is the first MAC address and then checks, as illustrated in FIG. 13, that a collision occurs in all of the banks 21 to 23.

Thus, the collision detection unit 111 receives, from the collision avoidance control unit 105, an instruction to set, as the target MAC address, the entry that stores therein the MAC#E that is included in the bank 22 having the second highest priority and that comes into collision with the MAC#B. Then, in response to the instruction received from the collision detection unit 111, as illustrated in FIG. 14, the collision address temporary management unit 103 stores, in the FILO buffer 104, the entry information on the MAC#E that is the second target MAC address.

Then, as illustrated in FIG. 15, the collision detection unit 111 sequentially checks, for the MAC#E that is the second target MAC address, the entry of each of the banks 21 to 23 associated with the calculation result obtained by using the hash expression for each of the banks 21 to 23. Here, the collision detection unit 111 detects that the entry associated with the calculation result of the hash calculation of the MAC#E in the bank 23 is a free entry. Consequently, the collision detection process performed by the collision detection unit 111 has been ended.

Thus, as illustrated in FIG. 16, the registration unit 112 registers the MAC#E in the detected free entry. In this state, two entries in each of which the MAC#E is registered are present in the MAC address table 20. Furthermore, the entry information on the MAC#E is stored in the top of the FILO buffer 104.

Thus, as illustrated in FIG. 17, the registration unit 112 deletes the information on the original entry of the MAC#E in the MAC address table 20 and sets the subject entry to a free entry. At this time, the free entry management unit 106 stores therein the information on the free entry. Furthermore, in response to the instruction received from the registration unit 112, the collision address temporary management unit 103 deletes the information on the MAC#E that is present in the top in the FILO buffer 104.

Then, the registration unit 112 determines whether the FILO buffer 104 becomes empty. In this case, because the FILO buffer 104 is not empty, as illustrated in FIG. 18, the registration unit 112 further performs the expelling process and registers, in the free entry stored in the free entry management unit 106, the MAC#B that is included in the last registration entry information in the FILO buffer 104. The state of the MAC address table 20 and the FILO buffer 104 after this registration is the state illustrated in FIG. 19. In this state, two entries in each of which the MAC#B is registered are present in the MAC address table 20. Furthermore, the entry information on the MAC#B is stored in the top of the FILO buffer 104.

Thus, as illustrated in FIG. 20, the registration unit 112 deletes the information on the original entry of the MAC#B in the MAC address table 20 and sets the subject entry to a free entry. At this time, the free entry management unit 106 stores therein the information on the free entry. Furthermore, in response to the instruction received from the table control management unit 101, the collision address temporary management unit 103 deletes the information on the MAC#B that is present in the top in the FILO buffer 104.

Then, the registration unit 112 determines whether the FILO buffer 104 becomes empty. In this case, because the FILO buffer 104 becomes empty, as illustrated in FIG. 21, the registration unit 112 registers the MAC#A stored in the registration unit 112 by itself into the free entry that is stored in the free entry management unit 106. The registration unit 112 mentioned here corresponds to an example of a "storing unit".

Consequently, the registration process performed on the MAC address has been completed and both the MAC address table 20 and the FILO buffer 104 become the state illustrated in FIG. 22. In this way, the registration process of the MAC address performed when a free entry related to the first target MAC address is not present has been completed. Here, a description has been given of a case in which the free entry related to the second target MAC address is detected; however, in a case in which the free entry related to the second target MAC address is not detected, it is also possible to register the reception MAC address by repeating the same process.

Figure 23:
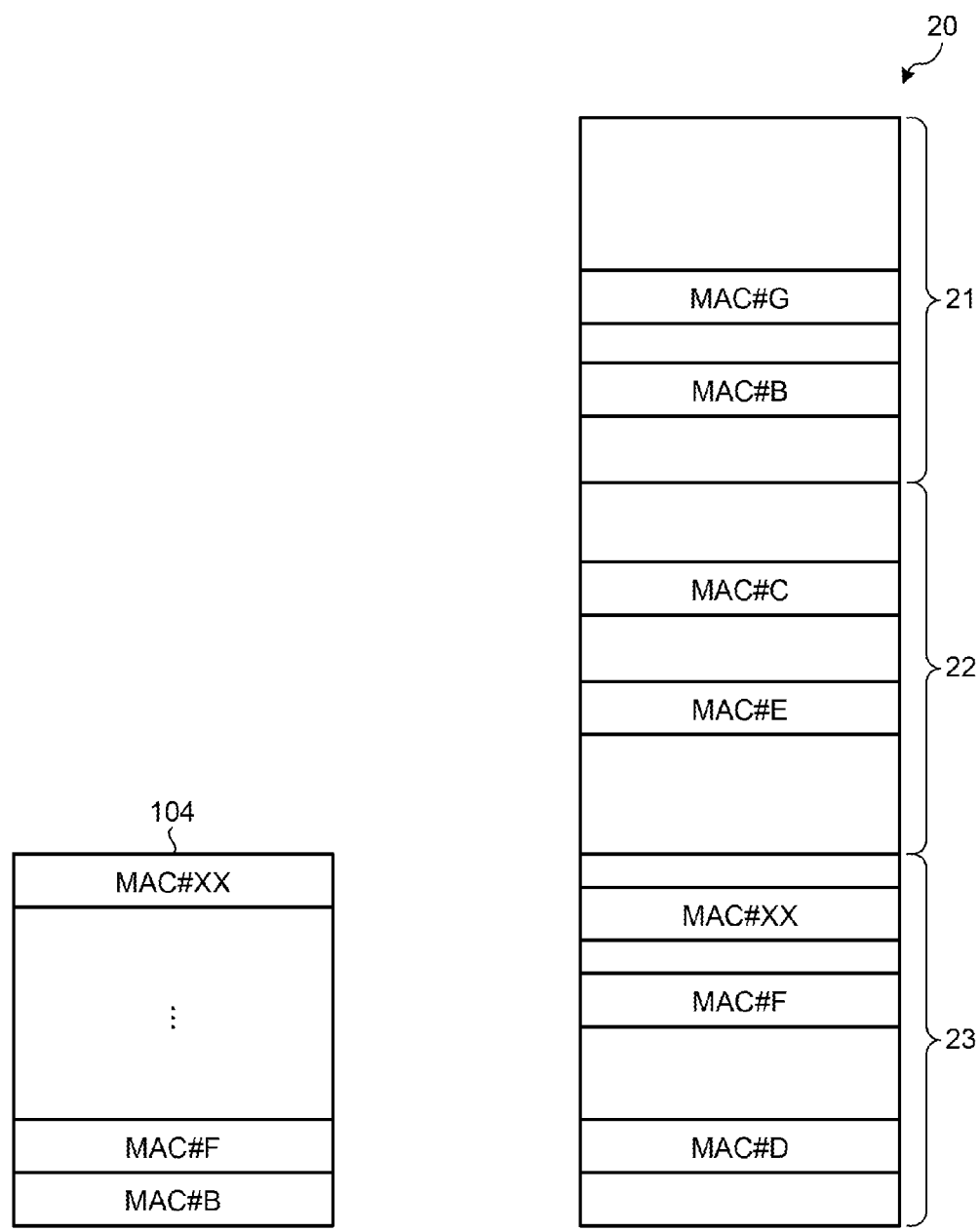
FIG. 23 is a schematic diagram illustrating a state in which a free space is not present in the FILO buffer.
Figure 24:
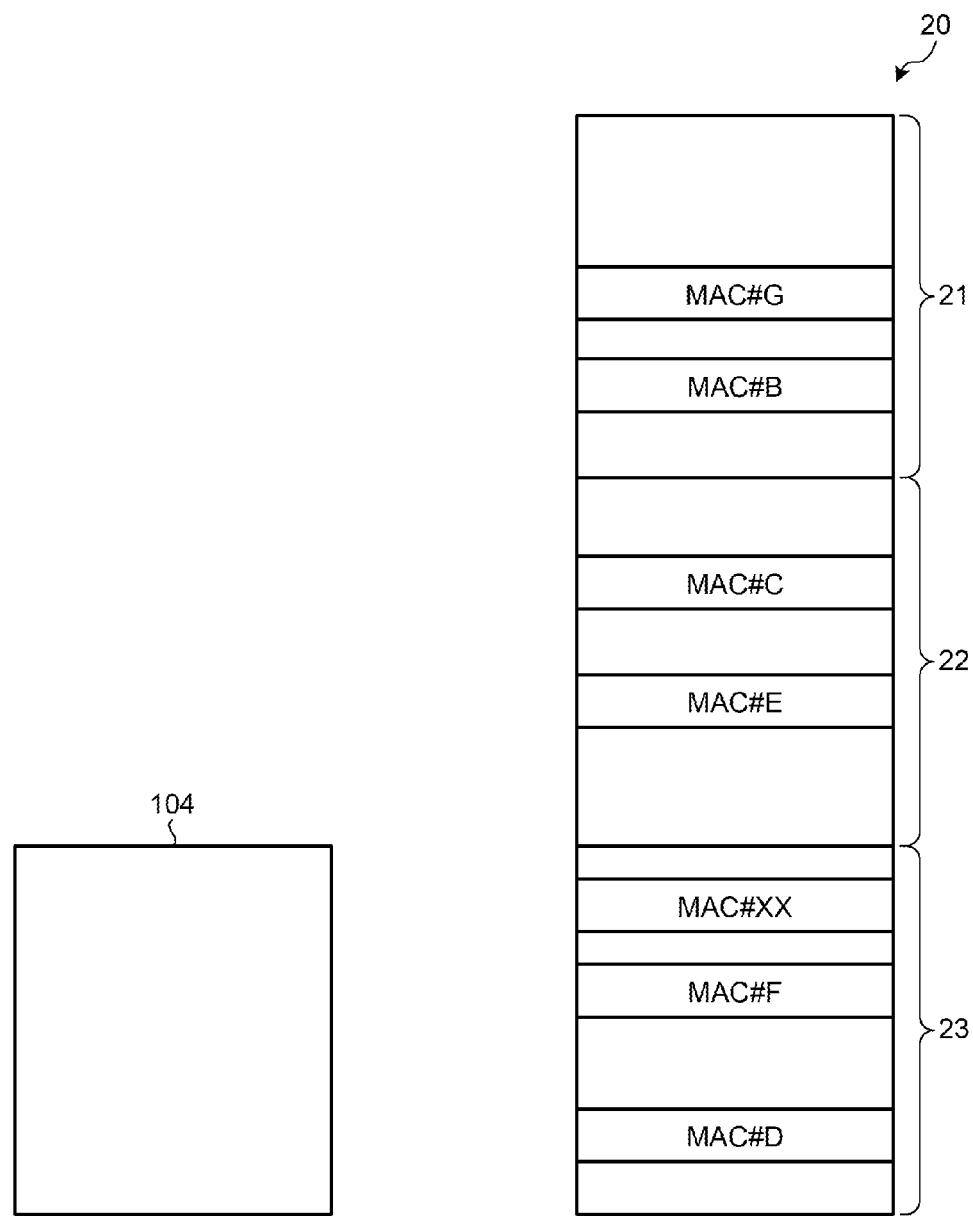
FIG. 24 is a schematic diagram illustrating a state in which the FILO buffer is emptied and restored.

In the following, the process performed by the table management unit 10 if a free space is not present in the FILO buffer 104 will be described with reference to FIGS. 23 and 24. FIG. 23 is a schematic diagram illustrating a state in which a free space is not present in the FILO buffer. Furthermore, FIG. 24 is a schematic diagram illustrating a state in which the FILO buffer is emptied and restored.

If the table control management unit 101 repeats the collision detection process but a free entry is not found, pieces of entry information are accumulated in the FILO buffer 104 and, as illustrated in FIG. 23, a free entry is not present in the FILO buffer 104. In this case, the collision address temporary management unit 103 notifies the collision detection unit 111 that a free entry is not present in the FILO buffer 104. The collision detection unit 111 stops the collision detection process.

In response to the notification indicating that a free entry is not present in the FILO buffer 104, the collision detection unit 111 notifies the collision address temporary management unit 103 of an instruction to make the FILO buffer 104 empty. The FILO buffer 104 makes the FILO buffer 104 empty. Consequently, as illustrated in FIG. 24, the FILO buffer 104 does not have the entry information. Furthermore, in this case, registration or deletion with respect to the entry in the MAC address table 20 is not performed. Consequently, the MAC address table 20 and the FILO buffer 104 maintain the same state as that before a registration request for the reception MAC address is received and thus instantaneous interruption due to the deletion of the already registered entry does not occur.

Furthermore, the collision detection unit 111 notifies the registration unit 112 that the registration of the reception MAC address is not available. In response to the notification received from the collision detection unit 111, the registration unit 112 notifies the registration result output unit 107 that the registration of the reception MAC address is not available. In response to the instruction received from the registration unit 112, the registration result output unit 107 notifies the control terminal 3 that the registration of the MAC address is not available.

Figure 25:
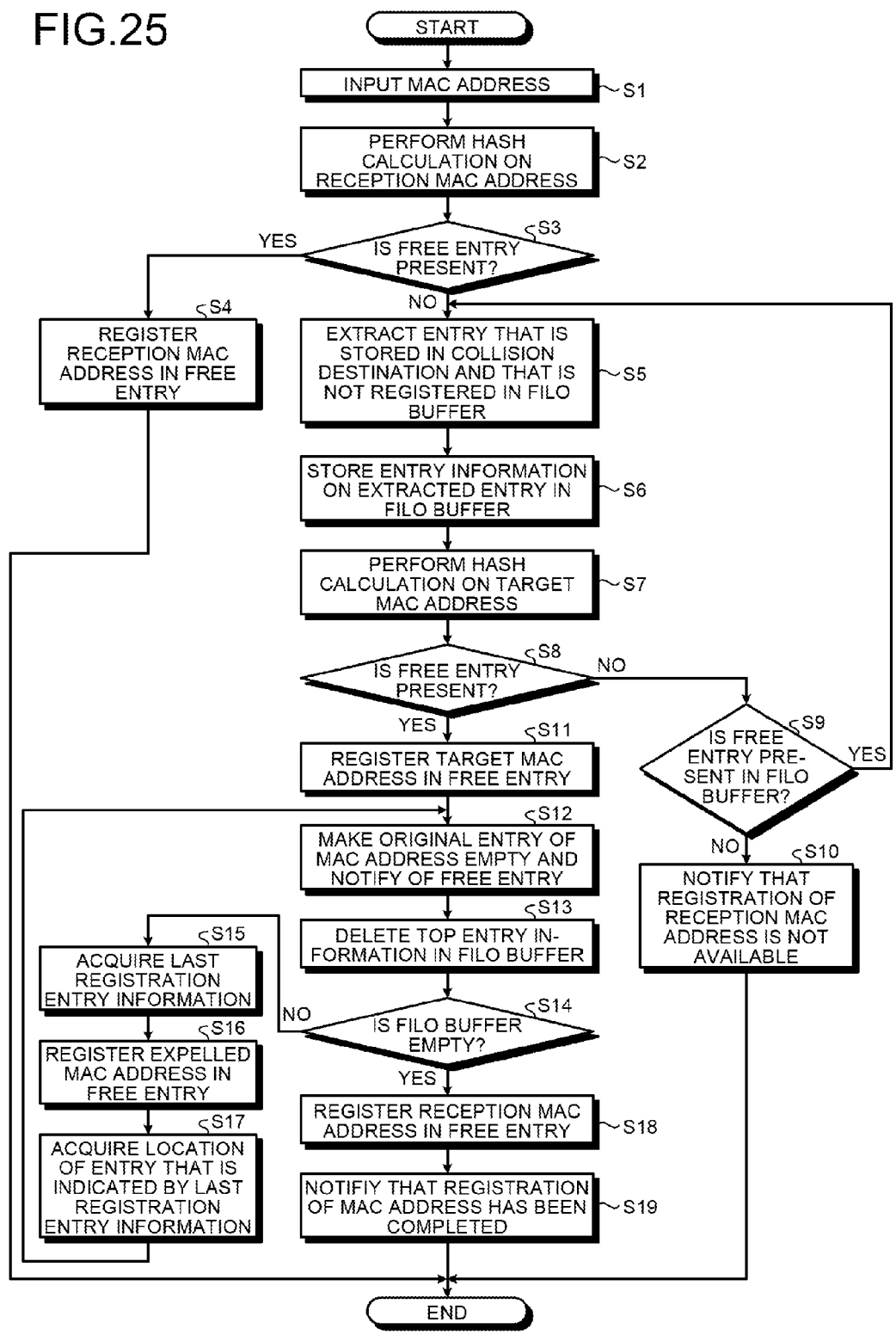
FIG. 25 is a flowchart illustrating the flow of the registration process performed on the MAC address by a communication device according to a first embodiment.

In the following, the overall flow of the registration process performed on the MAC address by the communication device according to the first embodiment will be described with reference to FIG. 25. FIG. 25 is a flowchart illustrating the flow of the registration process performed on the MAC address by a communication device according to a first embodiment.

A user inputs, to the table control management unit 101 by using the control terminal 3, the MAC address that is desired to be registered (Step S1).

The collision detection unit 111 instructs the hash unit 102 to perform the hash calculation on the reception MAC address. The hash unit 102 performs the hash calculation on the reception MAC address in accordance with the priority of the banks (Step S2) and outputs the calculation result to the collision detection unit 111.

The collision detection unit 111 determines whether a free entry is present, i.e., determines whether a collision occurs in all of the banks (Step S3). Here, in practice, the collision detection process performed by the collision detection unit 111 and the hash unit 102 is performed for each bank; however, here, for an explanation, the collision detection processes are collectively represented by a single Step.

If a free entry is present (Yes at Step S3), the collision detection unit 111 registers the reception MAC address in the detected free entry (Step S4) and ends the registration process of the MAC address.

In contrast, if a free entry is not present (No at Step S3), the collision detection unit 111 notifies the collision avoidance control unit 105 of the notification indicating that a collision occurs together with the information on each of the entries that come into collision. The collision avoidance control unit 105 extracts an entry that is stored in the collision destination and that is not registered in the FILO buffer 104 (Step S5). Then, the collision avoidance control unit 105 notifies the collision detection unit 111 of the information on the extracted entry.

The collision detection unit 111 receives a notification of the information on the extracted entry from the table control management unit 101 and acquires, on the basis of the information, the target MAC address from the MAC address table 20. Then, the collision detection unit 111 instructs the collision address temporary management unit 103 to store the entry information on the extracted entry in the FILO buffer 104. In response to the instruction received from the collision detection unit 111, the collision address temporary management unit 103 stores the entry information on the extracted entry in the FILO buffer 104 (Step S6).

Then, the collision detection unit 111 instructs the hash unit 102 to perform the hash calculation on the target MAC address. The hash unit 102 performs the hash calculation on the target MAC address in accordance with the priority of the banks (Step S7) and outputs the calculation result to the collision detection unit 111.

The collision detection unit 111 checks whether a collision occurs in the entry of each bank associated with the calculation result. Then, the collision detection unit 111 determines whether a free entry is present, i.e., determines whether a collision occurred in all of the banks related to the target MAC address (Step S8).

If a free entry is not present (No at Step S8), the collision detection unit 111 instructs the collision address temporary management unit 103 to determine whether a free entry is present in the FILO buffer 104, i.e., determine whether the FILO buffer 104 is filled. The collision address temporary management unit 103 determines whether a free entry is present in the FILO buffer 104 (Step S9) and then notifies the collision detection unit 111 of the determination result.

If a free space is present in the FILO buffer 104 (Yes at Step S9), the collision detection unit 111 returns to Step S5.

In contrast, if a free space is not present in the FILO buffer 104 (No at Step S9), the collision detection unit 111 notifies the registration result output unit 107 that the registration of the reception MAC address is not available. In response to this, the registration result output unit 107 notifies the control terminal 3 that the registration of the reception MAC address is not available (Step S10).

In contrast, if a free entry is present (Yes at Step S8), the collision detection unit 111 outputs the information on the target MAC address and the free entry to the registration unit 112. Then, the registration unit 112 registers the target MAC address in the free entry (Step S11).

Then, the registration unit 112 makes the original entry of the registered MAC address empty and a free entry. The registered MAC address mentioned here is the target MAC address or the expelled MAC address. Furthermore, the registration unit 112 notifies the free entry management unit 106 of the free entry (Step S12).

The registration unit 112 instructs the collision address temporary management unit 103 to delete the entry information at the top in the FILO buffer 104. In response to the instruction received from the registration unit 112, the collision address temporary management unit 103 deletes the entry information at the top in the FILO buffer 104 (Step S13).

The registration unit 112 inquires of the collision address temporary management unit 103 whether the FILO buffer 104 is empty and then determines, in accordance with the response to the inquiry, whether the FILO buffer 104 is empty (Step S14).

If the FILO buffer 104 is not empty (No at Step S14), the registration unit 112 instructs the collision address temporary management unit 103 to provide the last registration entry information in the FILO buffer 104. In response to the instruction received from the registration unit 112, the collision address temporary management unit 103 acquires the last registration entry information from the FILO buffer 104. Then, the registration unit 112 acquires the last registration entry information from the collision address temporary management unit 103 (Step S15).

Then, the registration unit 112 acquires the information on the free entry from the free entry management unit 106.

Then, the registration unit 112 registers, in the free entry, the expelled MAC address that is the MAC address included in the last registration entry information (Step S16).

Then, the registration unit 112 acquires the location of the entry that is indicated by the last registration entry information (Step S17). Thereafter, the registration unit 112 returns to Step S12.

In contrast, if the FILO buffer 104 is empty (Yes at Step S14), the registration unit 112 acquires the information on the free entry from the free entry management unit 106. Then, the registration unit 112 registers, in the free entry, the reception MAC address that is held by the registration unit 112 (Step S18).

Then, the registration unit 112 notifies the registration result output unit 107 that the registration of the reception MAC address has been completed. The registration result output unit 107 sends a notification of the completion of the registration of the reception MAC address to the control terminal 3 and notifies a user that the registration of the MAC address has been completed (Step S19).

As described above, the communication device according to the first embodiment performs hash calculation that is different for each bank and, if a free entry is not found, repeats a process of selecting a single entry from among the entries at the collision destination and detecting a free entry. Then, if a free entry is detected, the communication device according to the first embodiment sequentially registers the MAC addresses that have been subjected to free entry detection in the banks. Consequently, the communication device according to the first embodiment can reduce the probability that the registration of a MAC address is not available at the time of registration due to a collision.

Furthermore, the communication device according to the first embodiment uses a typical memory instead of using a precious memory, such as a TCAM, for a memory that stores therein a MAC address table and reduces the probability that the registration is not available due to a collision. Consequently, the communication device according to the first embodiment can manage a large volume of table at a low cost.

(First Modification)

Figure 26:
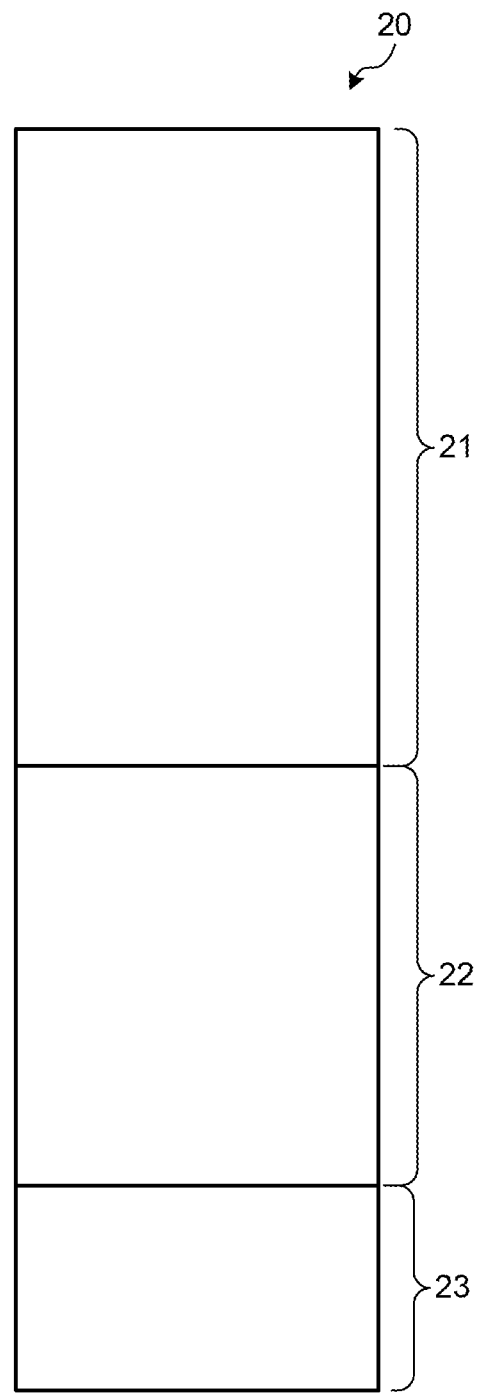
FIG. 26 is a schematic diagram illustrating an example of an allocation method in which the size of each bank is changed.

Regarding the communication device described in the first embodiment, a description has been given of a case, as an example, a bank is equally divided. However, the allocation method of the bank is not particularly limited. FIG. 26 is a schematic diagram illustrating an example of an allocation method in which the size of each bank is changed. Furthermore, FIG. 27 is a schematic diagram illustrating an example of the allocation method in which the number of banks is changed.

Here, a description will be given of a case in which, similarly to the first embodiment, the priority of the banks is decreased in the order of the banks 21, 22, and 23. In this case, for example, similarly to the case illustrated in FIG. 26, the bank that has a high priority can be made larger. For example, it may also possible to set the bank 21 to the maximum bank, set the bank 22 to the second largest bank, and set the bank 23 to the smallest bank. In this way, by changing the size of the banks, it is possible to increase the possibility that free entry is detected at the first collision detection. Consequently, the probability of a detection process performed by the communication device 1 using MAC addresses at the collision destination is decreased and thus the processing load can be reduced.

Furthermore, for example, in the first embodiment, a description has been given of a case, as an example, of a three-way division; however, the number of banks is not particularly limited. For example, if the number of banks is increased as the banks 21 to 26 illustrated in FIG. 27, because hash expression that is different for each bank is used, in the communication device 1, the probability that a free entry is detected at the time of registration becomes high. Thus, by increasing the number of banks, the communication device 1 does not need to perform the detection by using the subsequent MAC address that comes into collision. Consequently, the communication device 1 can suppress the number of times of the detection performed by using the MAC addresses at the collision destination and thus the processing load can be reduced.

Figure 27:
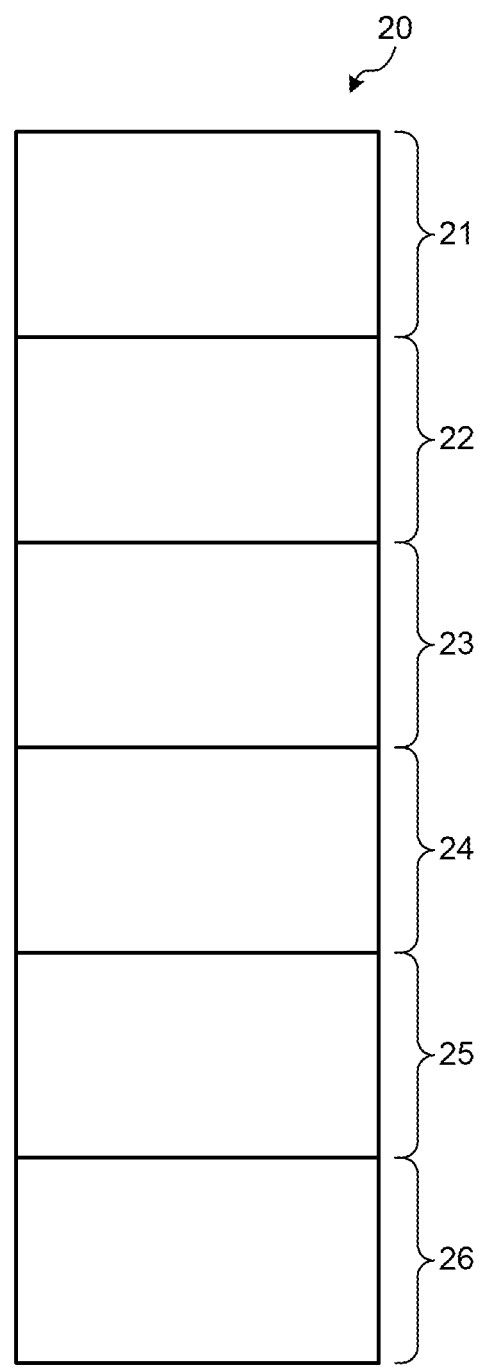
FIG. 27 is a schematic diagram illustrating an example of the allocation method in which the number of banks is changed.

Furthermore, the dividing methods illustrated in FIGS. 26 and 27 may also be combined. Namely, the bank that has a high priority may also be larger while the memory that stores therein the MAC address table 20 is divided into smaller pieces.

(Second Modification)

Furthermore, in the first embodiment, the table control management unit 101 stores therein the reception MAC address; however, the method of holding the information on the reception MAC address is not limited to this as long as the table control management unit 101 can acquire the information on the reception MAC address at the end of the expelling process. For example, the entry information of the reception MAC address is stored in the FILO buffer 104 first and then the entry information on the target MAC address, whereby the table control management unit 101 may also hold the information on the reception MAC address.

Furthermore, in the first embodiment, the FILO buffer 104 is used; however, the FILO buffer 104 does not need to be arranged as long as using the configuration in which, after the reception MAC address comes into collision with all of the banks, the collision detection process is performed only once.

[b] Second Embodiment

In the following, a second embodiment will be described. The communication device according to the second embodiment differs from the first embodiment in that, if a free space is not present in the FILO buffer 104, the entry that stores therein the dynamic MAC address is made empty and a free entry is created. The table management unit 10 according to the second embodiment is also represented by the block diagram illustrated in FIG. 5. In a description below, it is assumed that components having the same function as that performed in the first embodiment have the same function unless otherwise noted.

First, similarly to the first embodiment, if the reception MAC address comes into collision with all of the banks, the table management unit 10 according to the second embodiment repeats the collision detection process by using the MAC address at the collision destination as the target MAC address.

Figure 28:
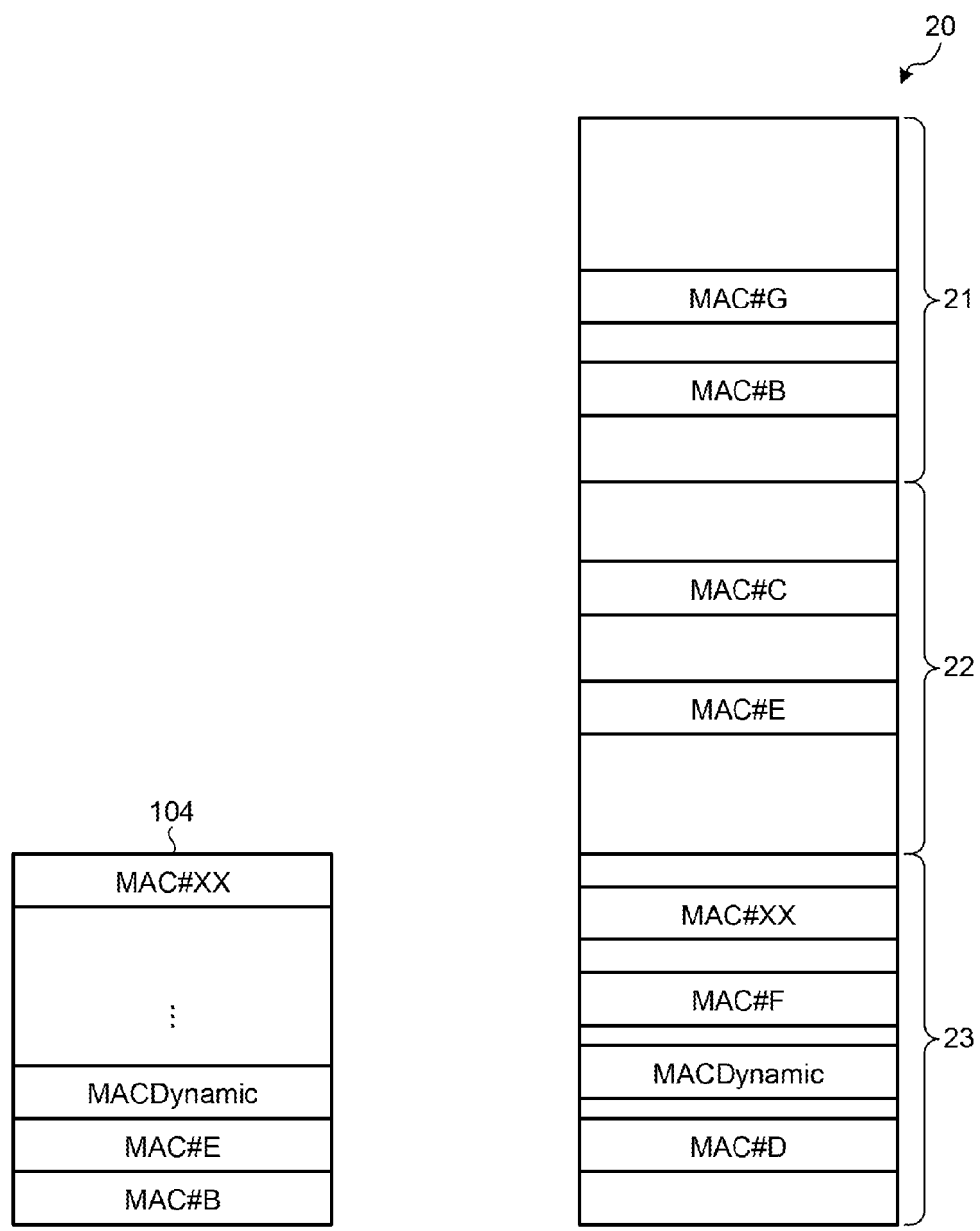
FIG. 28 is a schematic diagram illustrating a state in which a free space is not present in a FILO buffer in a second embodiment.

Furthermore, due to the repetition of the collision detection process, as illustrated in FIG. 28, it is conceivable that a free space is not present in the FILO buffer 104. FIG. 28 is a schematic diagram illustrating a state in which a free space is not present in a FILO buffer in a second embodiment. At this time, in the FILO buffer 104, a plurality of pieces of entry information is stored. Then, the entry information includes therein the entry information on the dynamic entry that is the entry that includes therein the dynamic MAC address and the entry information on the static entry that is the entry that includes therein the static MAC address.

In FIG. 28, the entry indicated by MAC Dynamic in the MAC address table 20 is the entry, from among one of the entries, in which the dynamic MAC address is registered. Furthermore, the entry information indicated by MAC Dynamic in the FILO buffer 104 is entry information that is associated with the MAC Dynamic in the MAC address table 20. In each of the pieces of the entry information in the MAC address table 20 and in the FILO buffer 104, a flag indicating the MAC Dynamic is stored.

Here, the static MAC address is the address that is intentionally registered by a user such that a MAC address is uniquely associated with a port. Thus, the degree of importance of the static MAC address is high and, furthermore, it is difficult to automatically perform registration after deletion. In contrast, the dynamic MAC address is the address in which the association relationship between a port and a MAC address is automatically registered. Consequently, the degree of importance is relatively low and it is easy to automatically perform the registration even if the MAC address is deleted. Then, even if a free entry is created by making the entry in which the static MAC address is registered empty, the probability that operational problems will occur is low.

Thus, if the registration unit 112 receives a notification indicating that a free space is not present in the FILO buffer 104 from the collision detection unit 111, the registration unit 112 instructs the collision address temporary management unit 103 to detect the entry information on the dynamic entry. Then, the registration unit 112 acquires the entry information on the dynamic entry from the collision address temporary management unit 103.

In contrast, if entry information on the dynamic entry is not found, the registration unit 112 receives a notification indicating that entry information on the dynamic entry is not present from the collision address temporary management unit 103. In this case, the registration unit 112 notifies the registration result output unit 107 that the registration of the reception MAC address is not available.

If the registration unit 112 acquires the entry information on the dynamic entry, the registration unit 112 instructs the collision address temporary management unit 103 to delete the pieces of the entry information starting from the entry information at the top in the FILO buffer 104 to the entry information on the acquired dynamic entry.

Figure 29:
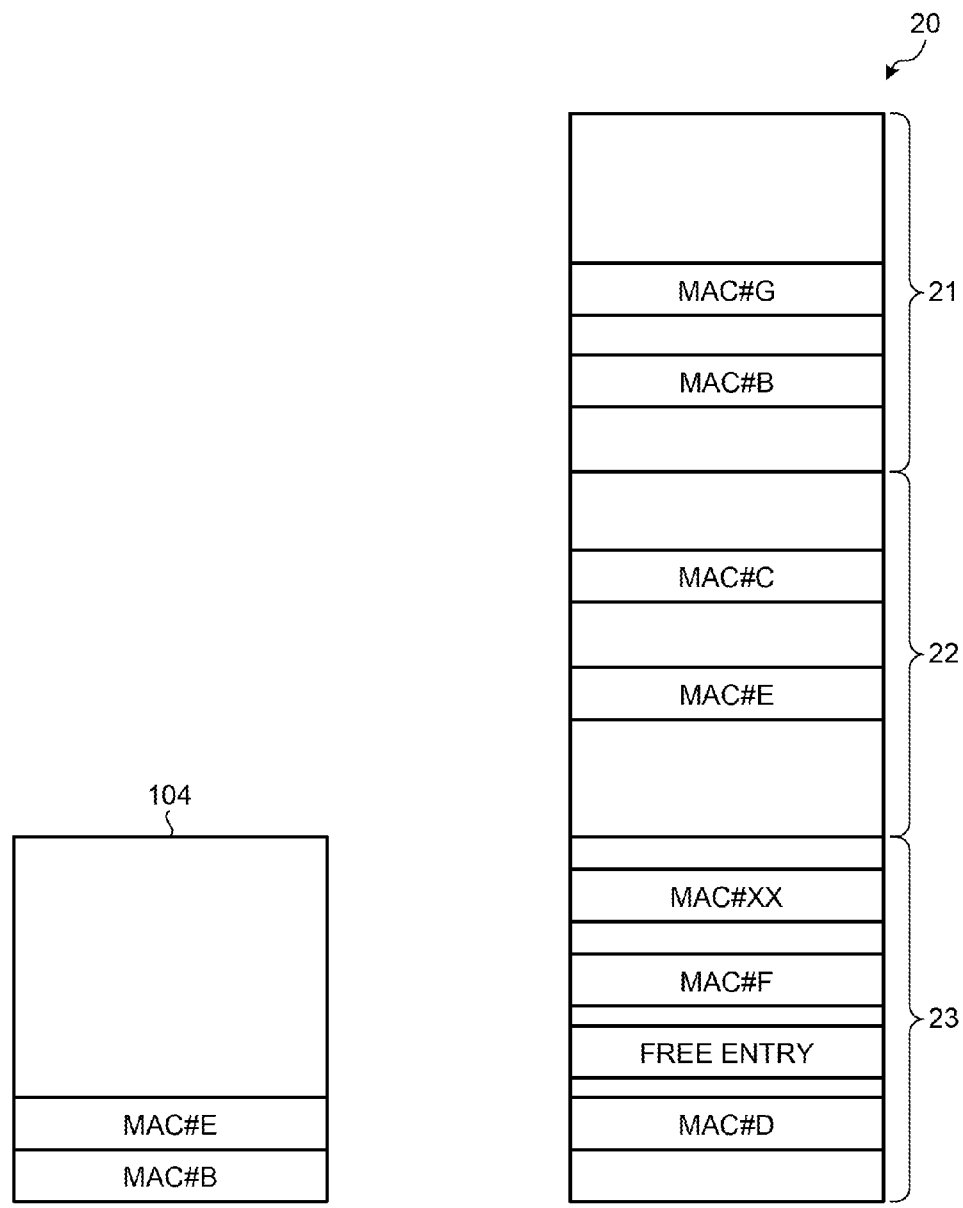
FIG. 29 is a schematic diagram illustrating a state in which a dynamic entry is set to be a free entry.

Then, the registration unit 112 makes the dynamic entry in the MAC address table 20 indicated by the acquired entry information empty. The state of the MAC address table 20 and the FILO buffer 104 at this time is illustrated in FIG. 29. FIG. 29 is a schematic diagram illustrating a state in which a dynamic entry is set to be a free entry.

In this case, as illustrated in FIG. 29, the pieces of the entry information starting from the entry information on the MAC#XX that is the top entry information in the FILO buffer 104 illustrated in FIG. 28 to the entry information on the MAC Dynamic are deleted from the FILO buffer 104. In this state, in the FILO buffer 104, two pieces of entry information, such as MAC#E and MAC#B, are stored. Furthermore, in the MAC address table 20, the dynamic entry in which the MAC Dynamic was registered is the free entry.

Figure 30:
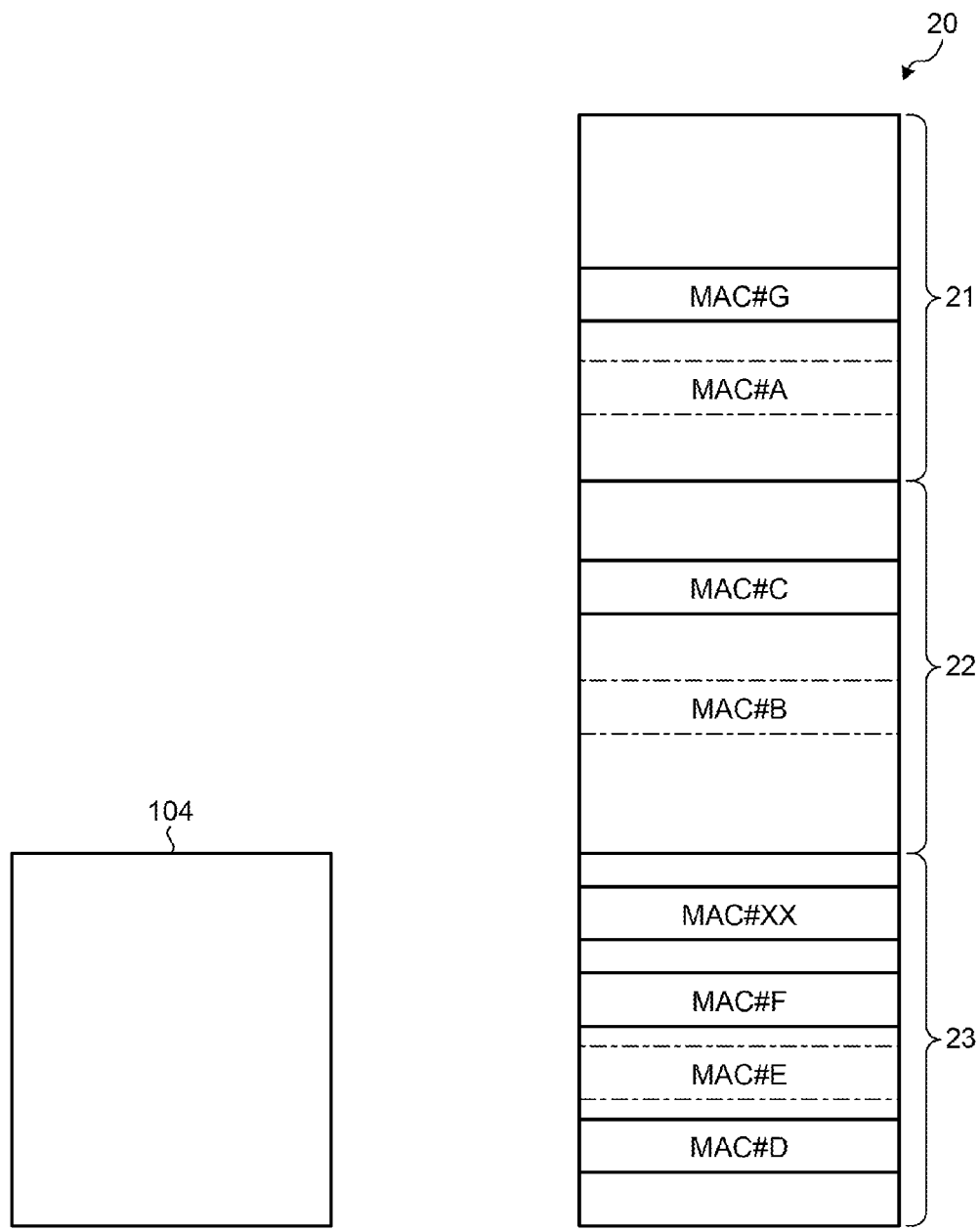
FIG. 30 is a schematic diagram illustrating a state after the completion of the registration process of the MAC address after the dynamic entry has been set to be a free entry.

Thereafter, the registration unit 112 performs the expelling process by setting the MAC#E and the MAC#B as the MAC addresses to be expelled. Then, the expelling process for the MAC#B is ended, the registration unit 112 registers the MAC#A that is the reception MAC address in the free entry that is the original entry of the MAC#B. The state of the MAC address table 20 and the FILO buffer 104 at this time is illustrated in FIG. 30. FIG. 30 is a schematic diagram illustrating a state after the completion of the registration process of the MAC address after the dynamic entry has been set to be a free entry.

Furthermore, if a free space is not present in the FILO buffer 104, the collision address temporary management unit 103 receives an instruction to detect the entry information the dynamic entry from the registration unit 112. Then, the collision address temporary management unit 103 searches the FILO buffer 104 and detects the entry information on the oldest dynamic entry. Then, the collision address temporary management unit 103 sends the entry information on the detected dynamic entry to the registration unit 112. In contrast, if the entry information on the dynamic entry is detected, the collision address temporary management unit 103 notifies the registration unit 112 that the entry information on the dynamic entry is present.

After sending the entry information on the dynamic entry, the collision address temporary management unit 103 receives an instruction to delete the entry information from the registration unit 112. Then, the collision address temporary management unit 103 deletes the entry information starting from the entry information at the top in the FILO buffer 104 to the entry information on the detected dynamic entry.

By performing the process described above, as illustrated in FIG. 30, if a dynamic entry is present in the entry in which the target MAC address is registered, the table control management unit 101 according to the second embodiment can complete the registration of the reception MAC address.

Figure 31:
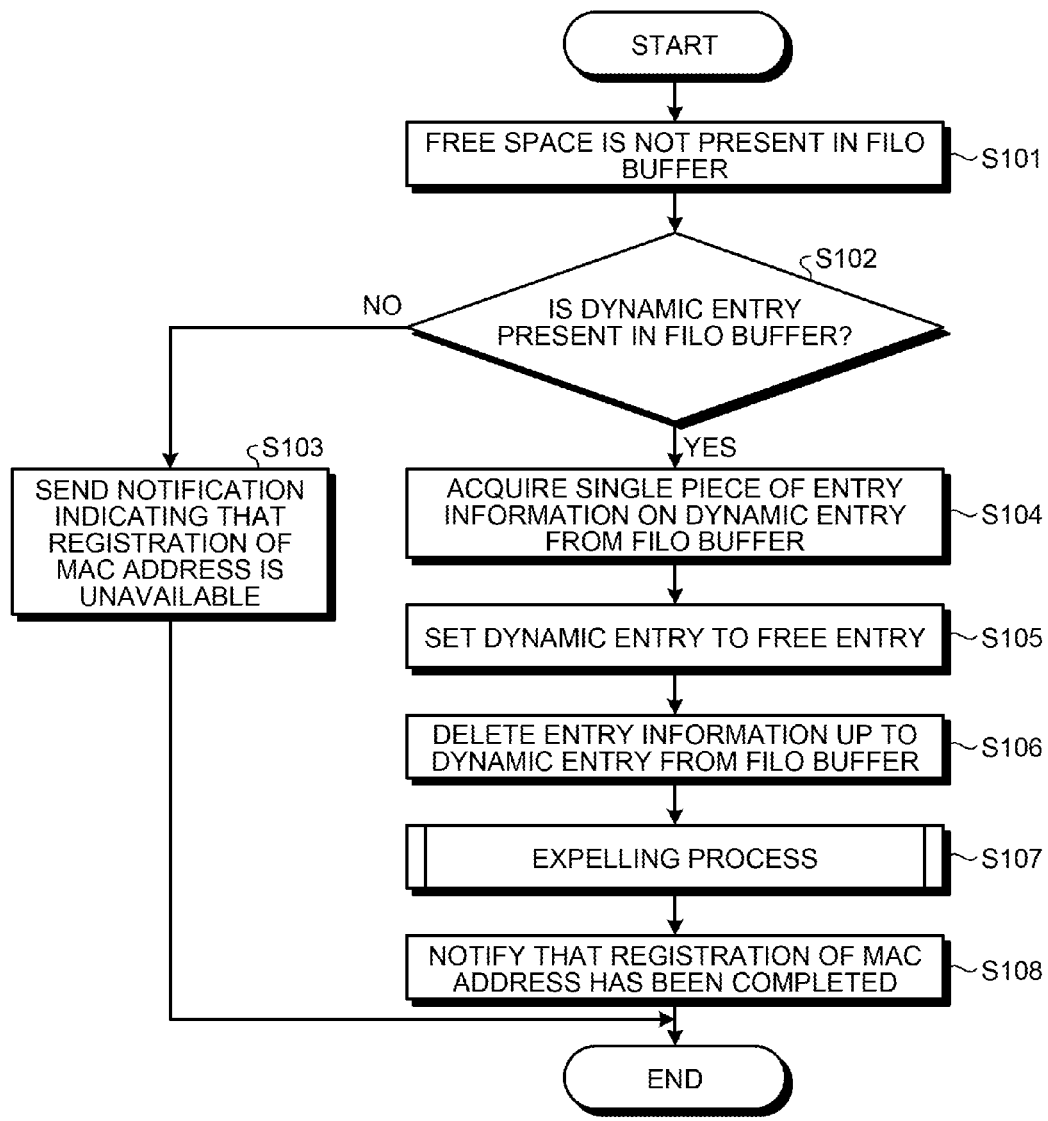
FIG. 31 is a flowchart illustrating the flow of a registration process performed on the MAC address by a communication device according to a second embodiment.

In the following, the registration process performed by the communication device 1 according to the second embodiment on the MAC address after a free space is not present in the FILO buffer 104 will be described with reference to FIG. 31. FIG. 31 is a flowchart illustrating the flow of a registration process performed on the MAC address by a communication device according to a second embodiment.

A free space is not present in the FILO buffer 104 (Step S101).

The registration unit 112 instructs the collision address temporary management unit 103 to send the entry information on the dynamic entry and a notification. Then, the registration unit 112 determines whether the dynamic entry is present in the FILO buffer 104 on the basis of the response received from the collision address temporary management unit 103 (Step S102).

If a dynamic entry is not present (No at Step S102), the registration unit 112 notifies the registration result output unit 107 that the registration of the reception MAC address is not available. In response to the notification received from the registration unit 112, the registration result output unit 107 sends a notification indicating that the registration of the MAC address is unavailable to the control terminal 3 and notifies the user of this state (Step S103).

In contrast, if the dynamic entry is present (Yes at Step S102), the registration unit 112 acquires the entry information on the dynamic entry from the collision address temporary management unit 103. In the second embodiment, the registration unit 112 acquires the entry information on the oldest dynamic entry in the FILO buffer 104. Consequently, the registration unit 112 acquires a single piece of the entry information on the dynamic entry from the FILO buffer 104 (Step S104).

Then, the registration unit 112 sets the dynamic entry in the MAC address table 20 indicated by the acquired entry information to a free entry (Step S105).

Furthermore, the registration unit 112 instructs the collision address temporary management unit 103 to delete the entry information starting from the entry information at the top in the FILO buffer 104 to the entry information on the detected dynamic entry. In response to the instruction received from the registration unit 112, the collision address temporary management unit 103 deletes the entry information starting from the entry information at the top in the FILO buffer 104 to the entry information on the detected dynamic entry (Step S106).

Then, the registration unit 112 performs the expelling process (Step S107).

Thereafter, the registration unit 112 notifies the registration result output unit 107 the completion of the registration of the reception MAC address. In response to the notification received from the registration unit 112, the registration result output unit 107 sends the completion of the registration is the MAC addresses to the control terminal 3 and notifies the user of this state (Step S108).

As described above, if a free space is not present in the FILO buffer 104 as the result of the collision detection process, the communication device according to the second embodiment performs the expelling process by setting the dynamic entry to a free entry and registers the reception MAC address. Consequently, the communication device according to the second embodiment can further reduce the probability that the registration of the MAC address comes into collision at the time of registration.

[c] Third Embodiment

In the following, a third embodiment will be described. The communication device according to the third embodiment differs from the first embodiment in that the collision detection process is performed by sequentially using, as the target MAC addresses, the MAC addresses that are registered in the entry at the collision destination with which the reception MAC address comes into collision. The table management unit 10 according to the third embodiment is also represented by the block diagram illustrated in FIG. 5. In a description below, it is assumed that components having the same function as that performed in the first embodiment have the same function unless otherwise noted.

Figure 32:
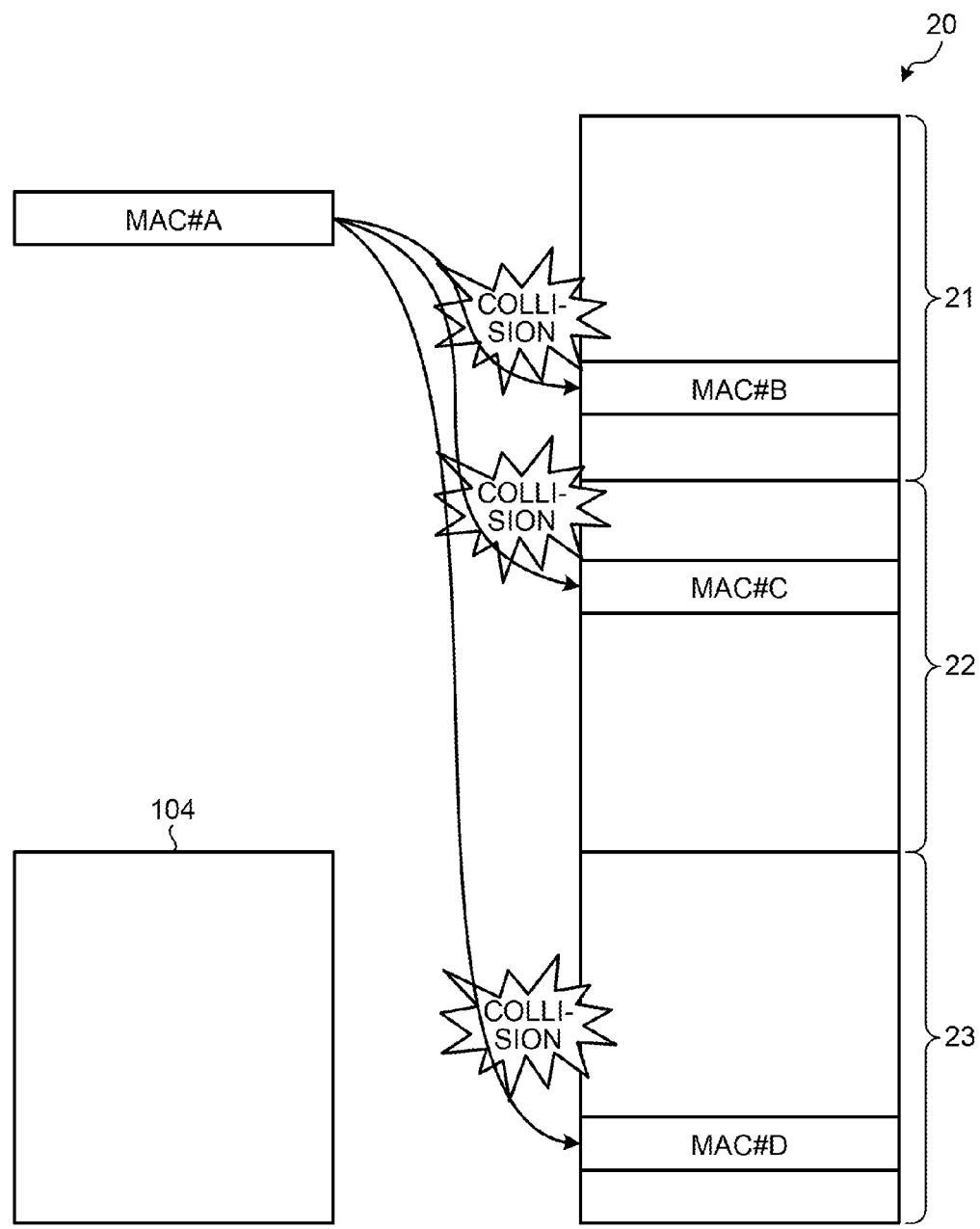
FIG. 32 is a schematic diagram illustrating a state of a collision detection process performed by using a reception MAC address in a third embodiment.

The collision detection unit 111 acquires the calculation result of the hash calculation performed on the MAC#A that is the reception MAC address from the hash unit 102 and determines whether a collision occurs in each of the banks. In this case, as illustrated in FIG. 32, the table control management unit 101 detects the occurrence of the collision in all of the banks indicated by the banks 21 to 23. FIG. 32 is a schematic diagram illustrating a state of a collision detection process performed by using a reception MAC address in a third embodiment.

Figure 33:
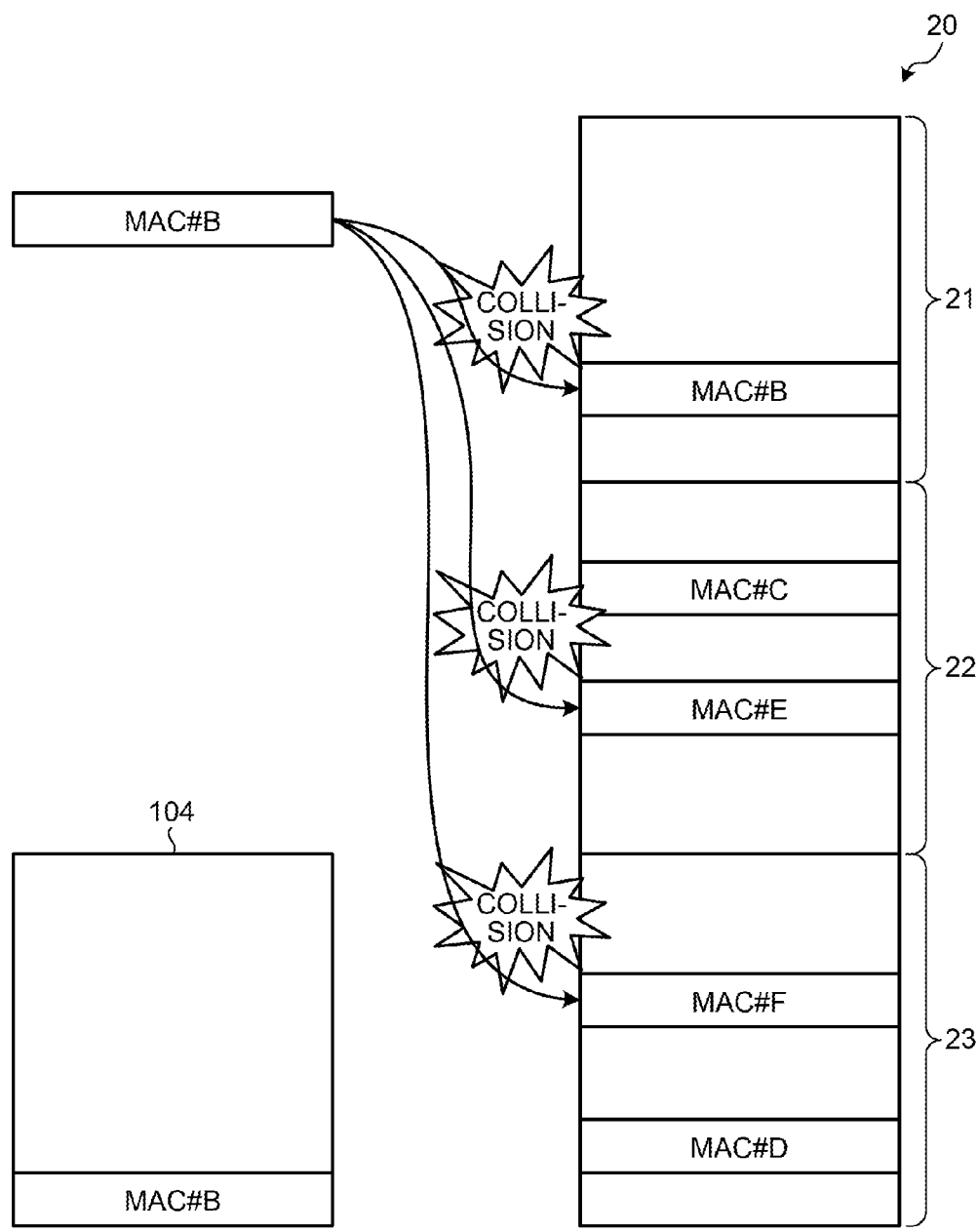
FIG. 33 is a schematic diagram illustrating a state of the collision detection process performed by using a first target MAC address in the third embodiment.

Then, the collision detection unit 111 allows the registration unit 112 to store the MAC#A. Then, the collision detection unit 111 acquires, from the collision avoidance control unit 105, a single piece of the entry information that is selected from the entries at the collision destination. Then, the collision detection unit 111 acquires the MAC address that is registered in the acquired entry as a first target MAC address. In this case, the collision detection unit 111 acquires the MAC#B as the first target MAC address. The collision detection unit 111 acquires the calculation result of the hash calculation performed on the MAC#B from the hash unit 102 and determines whether collision occurs in each of the banks. In this case, as illustrated in FIG. 33, the collision detection unit 111 detects the occurrence of the collision in all of the banks indicated by the banks 21 to 23. FIG. 33 is a schematic diagram illustrating a state of the collision detection process performed by using a first target MAC address in the third embodiment.

Figure 34:
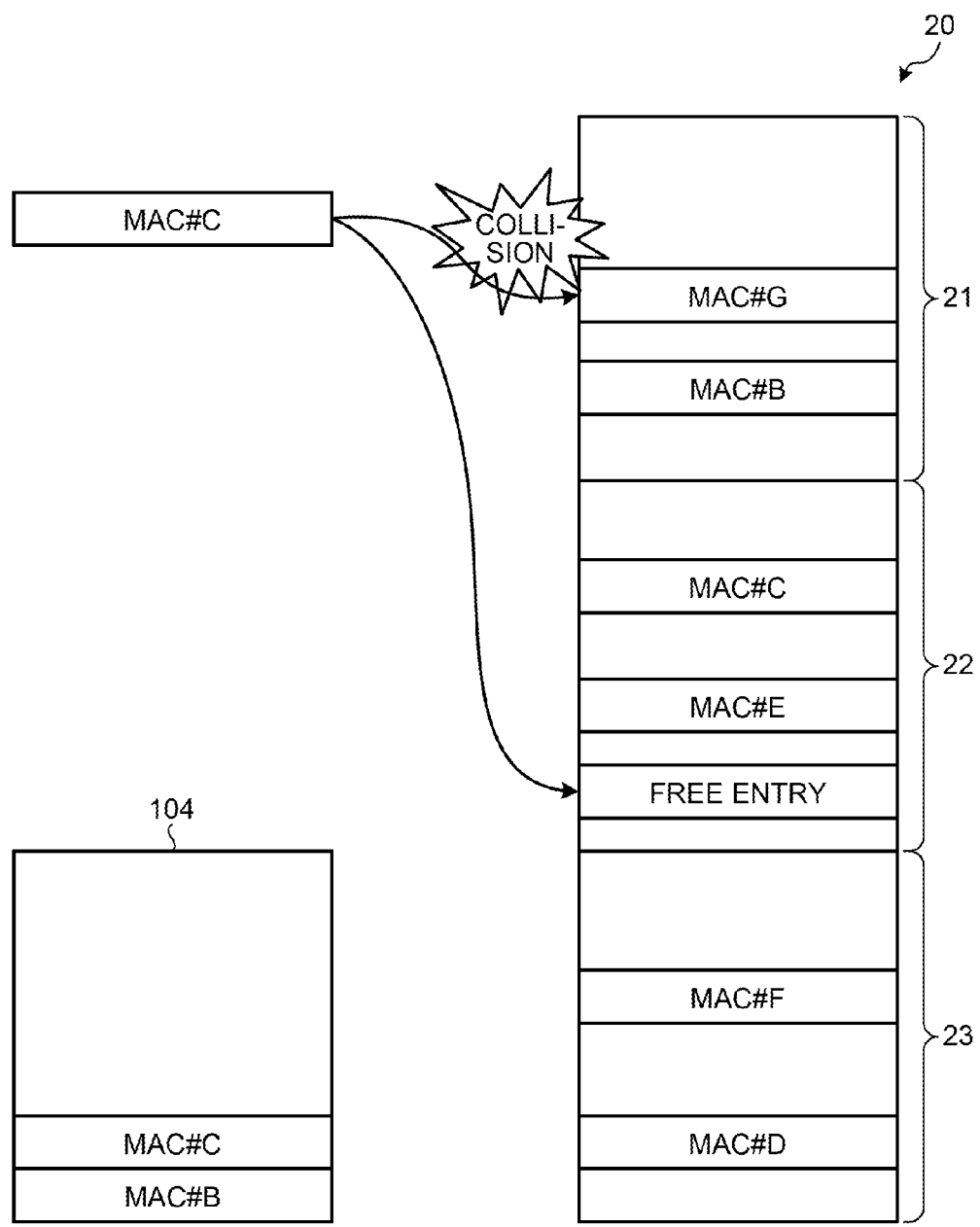
FIG. 34 is a schematic diagram illustrating a state of the collision detection process performed by using a second target MAC address in the third embodiment.

The collision detection unit 111 sends an instruction to store the entry information on the entry of the MAC#B in the FILO buffer 104 to the collision address temporary management unit 103. Then, the collision detection unit 111 acquires, from the collision avoidance control unit 105, the entry information of the entries that are other than the MAC#B and that are selected from among the entries at the collision destination. Then, the collision detection unit 111 acquires the MAC address that is registered in the acquired entry as the second target MAC address. In this case, the collision detection unit 111 acquires the MAC#C in the bank 22 as the second target MAC address. The collision detection unit 111 acquires the calculation result of the hash calculation performed on the MAC#C from the hash unit 102 and determines whether a collision occurs in each of the banks. In this case, as illustrated in FIG. 34, the collision detection unit 111 detects the entry in which registration is available in the bank 22. FIG. 34 is a schematic diagram illustrating a state of the collision detection process performed by using a second target MAC address in the third embodiment. As described above, the table control management unit 101 repeats the collision detection process until a free entry is detected.

Then, after the free entry is detected, the registration unit 112 performs, similarly to the first embodiment, the expelling process and registers the MAC#A that is eventually the reception MAC address.

The collision avoidance control unit 105 receives, from the collision detection unit 111, an input of the information on the occurrence of the collision and the entry of each bank in which the collision has occurred. Then, the collision avoidance control unit 105 selects an entry in accordance with the priority order of the banks and sends the information on the entry of the subject bank to the collision detection unit 111. Thereafter, in response to the notification of the occurrence of the collision, the collision avoidance control unit 105 selects, until an entry of the reception MAC address is not present at the collision destination, the bank that has the second highest priority order subsequent to the bank that was immediately previously selected and then notifies the collision detection unit 111 of the entry information on the entry in the subject bank at the collision destination. In this case, the collision avoidance control unit 105 selects the entry in which the MAC#B that is registered first in the bank 21; notifies of the subject entry information; selects the entry in which the MAC#C is registered in the bank 22, and notifies of the subject entry information.

At this point, there may be a case in which a free entry is not found even if all of the entries at the collision destination with respect to the MAC#A are set to the target MAC address. In this case, the collision avoidance control unit 105 may also select the entry that has not been set to the target entry from among the entries of the MAC#B and the MAC#C at the collision destination and, furthermore, the collision detection unit 111 may also repeat the collision detection process in accordance with the selection.

As described above, the communication device according to the third embodiment repeats the collision detection process by sequentially setting the entries at the collision destination as the target entries. Another method may also be used for selecting such target entries.

(Hardware Configuration)

Figure 35:
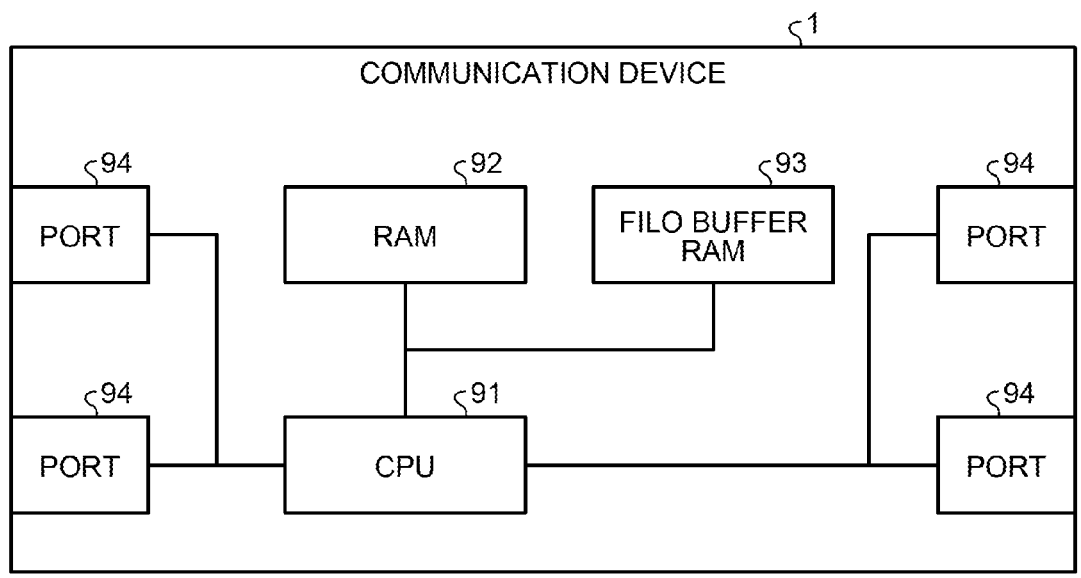
FIG. 35 is a block diagram illustrating the hardware configuration of the communication device.

In the following, the hardware configuration of the communication device 1 according to each of the embodiments will be described with reference to FIG. 35. FIG. 35 is a block diagram illustrating the hardware configuration of the communication device. The hardware configuration illustrated in FIG. 35 indicates a case of implementing the function of each of the units illustrated in FIGS. 2, 3, and 5 by using, for example, software.

The communication device 1 includes a CPU 91, a random access memory (RAM) 92, a FILO buffer RAM 93, and a port 94. The RAM 92, the FILO buffer RAM 93, and the port 94 are connected to the CPU 91 by a bus.

The RAM 92 stores therein the program that implements the function performed by the line IF circuits 12 and the control circuit 13 illustrated in FIG. 2. Furthermore, the RAM 92 stores therein the program that implements the function performed by the switch control unit 11, i.e., the function performed by the transfer unit 30 and the table management unit 10 illustrated in FIG. 3. Specifically, the RAM 92 stores therein the program that implements, as the function performed by the table management unit 10, the function performed by the table control management unit 101, the collision detection unit 111, and the registration unit 112 illustrated in FIG. 5. Furthermore, the RAM 92 stores therein the program that implements the function performed by the hash unit 102, the collision address temporary management unit 103, the collision avoidance control unit 105, and the free entry management unit 106. In this way, the RAM 92 stores therein various kinds programs including each of the programs described above. Furthermore, the RAM 92 stores therein the MAC address table 20.

The FILO buffer RAM 93 has the function performed by the FILO buffer 104.

The CPU 91 reads various kinds of programs from the RAM 92 and executes the programs, whereby the CPU 91 implements the function performed by the line IF circuits 12, the control circuit 13, and the switch control unit 11. Specifically, the CPU 91 and the RAM 92 implements, as the function performed by the switch control unit 11, the function performed by the table management unit 10, and the transfer unit 30. More specifically, the CPU 91 and the RAM 92 implements, as the function performed by the table management unit 10, function performed by the table control management unit 101, the hash unit 102, the collision address temporary management unit 103, the collision avoidance control unit 105, and the free entry management unit 106. In particular, the CPU 91 and the RAM 92 implements, as the function performed by the table control management unit 101, the function performed by the collision detection unit 111, and the registration unit 112.

In the embodiments, a description has been given of a case in which the function performed by each of the units is implemented by software; however, unlike this, the function performed by each of the units may also be implemented by hardware, such as an embedded circuit.

According to an aspect of an embodiment of the communication device and the communication control method of the present invention, an advantage is provided in that it is possible to improve the probability that a new entry is registered in a free entry without deleting already registered entries.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
    a MAC address table that is divided into a plurality of areas and that stores therein entries which are associated with values obtained by hashing MAC addresses by using different hash functions for each of the areas;
    a detecting unit that detects whether a first entry is present in each of the areas in the MAC address table, the first entry being associated with a value obtained by hashing, by using each of the hash functions, a first MAC address which is input, and that detects whether a second entry is present in each of the areas in the MAC address table, the second entry being associated with a value obtained by hashing, by using each of the hash functions, a second MAC address which is input;
    an acquiring unit that acquires, when it is detected that the first entry is present in each of the areas in the MAC address table, the second MAC address that is stored in the first entry that is present in one of the areas; and
    a storing unit that stores, when it is detected that the second entry is not present in any of the areas in the MAC address table, the second MAC address in the second entry and the first MAC address in the first entry.

2. The communication device according to claim 1, wherein
    when it is detected that the second entry is present in each of the areas in the MAC address table, the acquiring unit acquires a third MAC address that is stored in the second entry that is present in one of the areas,
    the detecting unit detects whether a third entry is present in each of the areas in the MAC address table, the third entry being associated with a value obtained by hashing the acquired third MAC address, and
    when it is detected that the third entry is not present in any of the areas in the MAC address table, the storing unit stores the third MAC address in the third entry, stores the second MAC address in the second entry, and stores the first MAC address in the first entry.

3. The communication device according to claim 1, wherein
    the acquiring unit acquires, until an entry which is associated with a value obtained by hashing the MAC address which is input is not present in any of the areas in the MAC address table, the MAC address which is stored in the entry, and
    when it is detected that an entry that is associated with a value obtained by hashing the second MAC address or the third MAC address is not present in any of the areas in the MAC address table, the storing unit sequentially stores, in the entries in the order of detected entries, MAC addresses in reverse chronological order of the MAC addresses which are input.

4. The communication device according to claim 1 further comprising a storage unit that stores therein the second MAC address, wherein
    the storing unit stores the second MAC address acquired from the storage unit in the second entry, deletes the second MAC address from the first entry and the storage unit, and then stores the first MAC address in the first entry.

5. The communication device according to claim 4, wherein fixed association or dynamic association between the MAC addresses and output destinations is registered in the MAC address table, and when a free space for storing an address is not present in the storage unit, the storing unit repeats a process of selecting, from among the addresses stored in the storage unit, a fixed address which is registered in the MAC address table in which the variable association is registered, deleting the registration of the fixed address from the MAC address table, deleting, from among the MAC addresses stored in the storage unit, the MAC address which is registered after the fixed address, acquiring a first latest MAC address that is stored in the storage unit most recently, storing the first latest MAC address in a first latest entry which is associated with a value obtained by hashing the fixed address, deleting the first latest MAC address from the first latest entry and the storage unit, then, acquiring, from among the MAC addresses stored in the storage unit, a second latest MAC address that is stored most recently, storing the second latest MAC address in the first latest entry, and deleting the second latest MAC address from the storage unit and a second latest entry that is associated with a value obtained by hashing the second latest MAC address.

6. The communication device according to claim 1, wherein when it is determined that the second entry is present in each of the areas in the MAC address table, the acquiring unit acquires the third MAC address other than the second MAC address from among one of the first entries, the detecting unit detects whether the third entry which is associated with a value obtained by hashing the third MAC address is present in each of the areas in the MAC address table, and when it is detected that the third entry is not present in any of the areas in the MAC address table, the storing unit stores the third MAC address in the third entry, stores the second MAC address in the second entry, and stores the first MAC address in the first entry.

7. A communication control method comprising:

detecting, performed by a communication device, whether, in each of the areas in a MAC address table that is divided into a plurality of areas and that stores therein entries that are associated with values obtained by hashing MAC addresses by using different hash functions for each of the areas, a first entry is present, the first entry being associated with a value obtained by hashing, by using each of the hash functions, a first MAC address that is input to the communication device;

acquiring, performed by the communication device, when the first entry is present in each of the areas in the MAC address table, a second MAC address that is stored in the first entry that is present in one of the areas;

detecting, performed by the communication device, whether a second entry is present in each of the areas in the MAC address table, the second entry being associated with a value obtained by hashing, by using each of the hash functions, the second MAC address; and storing, performed by the communication device, when the second entry is not present in any of the areas in the MAC address table, the second MAC address in the second entry and the first MAC address in the first entry.

* * * * *